US011560277B2

United States Patent
Hammer et al.

(10) Patent No.: US 11,560,277 B2
(45) Date of Patent: *Jan. 24, 2023

(54) METHOD OF SECURING AND TRANSFERRING A LOAD BETWEEN A VESSEL AND AN OFFSHORE INSTALLATION AND AN APPARATUS THEREFOR

(71) Applicant: PHOENIX II A/S, Copenhagen (DK)

(72) Inventors: Hoegni Hammer, Horsens (DK); Steen Tange Hasholt, Alleroed (DK)

(73) Assignee: PHOENIX II A/S, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,733

(22) Filed: Aug. 4, 2021

(65) Prior Publication Data

US 2021/0371219 A1    Dec. 2, 2021

Related U.S. Application Data

(63) Continuation of application No. 16/738,323, filed on Jan. 9, 2020, now Pat. No. 11,136,206, which is a
(Continued)

(30) Foreign Application Priority Data

Apr. 1, 2019    (DK) .......................... PA 2019 00389

(51) Int. Cl.
  *B65G 67/62*        (2006.01)
  *B63B 27/30*        (2006.01)
(Continued)

(52) U.S. Cl.
  CPC ............ *B65G 67/603* (2013.01); *B63B 27/30* (2013.01); *B65G 67/62* (2013.01); *E02B 17/021* (2013.01);
(Continued)

(58) Field of Classification Search
  CPC .............................. B65G 67/62; B63B 27/30
(Continued)

(56) References Cited

U.S. PATENT DOCUMENTS

| 1,520,150 A | 12/1924 | Skougor |
| 2,540,878 A | 2/1951 | Hayward |

(Continued)

FOREIGN PATENT DOCUMENTS

| CN | 201092380 Y | 7/2008 |
| CN | 102464213 A | 5/2012 |

(Continued)

OTHER PUBLICATIONS

Chinese Office Action and an English translation thereof dated Dec. 27, 2021.

(Continued)

*Primary Examiner* — Sunil Singh
(74) *Attorney, Agent, or Firm* — Harness, Dickey & Pierce, P.L.C.

(57) ABSTRACT

The offshore jack-up has a hull and a plurality of moveable legs engageable with the seafloor. The offshore jack-up is arranged to move the legs with respect to the hull to position the hull out of the water. The method comprises moving at least a portion of a vessel underneath the hull of the offshore jack-up or within a cut-out of the hull when the hull is positioned out of the water and the legs engage the seafloor. A stabilizing mechanism mounted on the jack-up is engaged against the vessel. The stabilizing mechanism is pushed down on the vessel to increase the buoyant force acting on the vessel.

25 Claims, 15 Drawing Sheets

Related U.S. Application Data continuation of application No. 16/434,844, filed on Jun. 7, 2019, now Pat. No. 10,569,977.

(51) Int. Cl.
| | |
|---|---|
| *B65G 67/60* | (2006.01) |
| *F03D 13/40* | (2016.01) |
| *E02B 17/02* | (2006.01) |
| *E02B 17/08* | (2006.01) |
| *E02B 17/00* | (2006.01) |
| *B66C 23/18* | (2006.01) |

(52) U.S. Cl.
CPC .......... *E02B 17/0809* (2013.01); *F03D 13/40* (2016.05); *B66C 23/185* (2013.01); *E02B 2017/006* (2013.01); *E02B 2017/0091* (2013.01); *F05B 2260/02* (2013.01)

(58) Field of Classification Search
USPC ......... 114/230.1, 230.13, 230.15; 414/137.9, 414/138.1, 138.2, 139.5, 139.6
See application file for complete search history.

(56) References Cited

U.S. PATENT DOCUMENTS

| | | | |
|---|---|---|---|
| 2,881,590 A | 4/1959 | Zaskey | |
| 2,916,002 A | 12/1959 | Hunsucker | |
| 2,963,179 A | 12/1960 | Kanady et al. | |
| 3,078,680 A | 2/1963 | Wepsala | |
| 3,138,931 A | 6/1964 | Brinkmann | |
| 3,139,197 A | 6/1964 | Bylo | |
| 3,276,211 A | 10/1966 | Drake | |
| 3,463,114 A | 8/1969 | Jack | |
| 3,623,444 A | 11/1971 | Lang | |
| 3,727,414 A | 4/1973 | Davies | |
| 3,740,957 A | 6/1973 | McKenzie | |
| 3,753,552 A | 8/1973 | Barron | |
| 3,793,974 A | 2/1974 | Bylo | |
| 3,804,268 A | 4/1974 | Barron et al. | |
| 3,826,384 A | 7/1974 | Cecce | |
| 4,048,937 A | 9/1977 | Heyman | |
| 4,085,695 A | 4/1978 | Bylo | |
| 4,111,144 A | 9/1978 | Ingvason | |
| 4,180,362 A | 12/1979 | Stair | |
| 4,227,831 A | 10/1980 | Evans | |
| 4,632,622 A | 12/1986 | Robinson | |
| 4,744,697 A | 5/1988 | Coppens | |
| 5,215,024 A | 6/1993 | McAllister | |
| 5,713,710 A | 2/1998 | Strong et al. | |
| 5,997,217 A | 12/1999 | Verret | |
| 6,309,160 B1 | 10/2001 | Greene, Jr. | |
| 7,131,388 B2 | 11/2006 | Moise, II et al. | |
| 7,513,713 B2 | 4/2009 | Thomas et al. | |
| 8,070,388 B2 | 12/2011 | Thomas | |
| 8,678,733 B2 | 3/2014 | Thomas et al. | |
| 8,757,954 B1 | 6/2014 | Roy | |
| 8,899,879 B2 | 12/2014 | Foo et al. | |
| 9,080,299 B2 | 7/2015 | Springett et al. | |
| 9,725,134 B2 | 8/2017 | Eriksen | |
| 10,569,977 B1* | 2/2020 | Hammer | B65G 67/62 |
| 11,136,206 B2* | 10/2021 | Hammer | B63B 27/10 |
| 2010/0293781 A1 | 11/2010 | Foo et al. | |
| 2015/0375831 A1 | 12/2015 | Taylor | |
| 2016/0001858 A1 | 1/2016 | Johnson | |

FOREIGN PATENT DOCUMENTS

| | | | |
|---|---|---|---|
| CN | 105648996 A | | 6/2016 |
| CN | 205998100 U | | 3/2017 |
| EP | 53770 A2 | | 6/1982 |
| EP | 1739005 B1 | | 8/2008 |
| EP | 2514913 A1 | | 10/2012 |
| EP | 2752361 A1 | | 7/2014 |
| EP | 2886722 A1 | | 6/2015 |
| GB | 2123776 A | | 2/1984 |
| GB | 2144375 A | | 3/1985 |
| KR | 101164227 B1 | | 7/2012 |
| KR | 20130141163 A | | 12/2013 |
| KR | 10-2017-0107628 A | | 9/2017 |
| KR | 10-2017-0109094 A | | 9/2017 |
| KR | 10-2017-0142652 A | | 12/2017 |
| KR | 10-2018-0003214 A | | 1/2018 |
| NL | 2015623 B1 | | 10/2016 |
| WO | WO-08/094171 A2 | | 8/2008 |
| WO | WO-2010/033083 A1 | | 3/2010 |
| WO | WO-12/175091 A1 | | 12/2012 |
| WO | WO-2014/070024 A2 | | 5/2014 |
| WO | WO-2014/098605 A1 | | 6/2014 |

OTHER PUBLICATIONS

Examination and Search Report dated Oct. 18, 2019 in Danish Application No. PA 2019 00389.
Non-Final Office Action dated Sep. 26, 2019 in U.S. Appl. No. 16/434,844.
Notice of Allowance dated Nov. 29, 2019 in U.S. Appl. No. 16/434,844.
Examination and Search Report dated Oct. 1, 2019 in Danish Application No. PA 201900391.
2nd Technical Examination dated Apr. 7, 2020 in Danish Application No. PA 2019 00391.
Invitation to Pay Additional Fees and Partial Search Report dated Apr. 27, 2020 in International Application No. PCT/DK2020/050077.
Non-Final Office Action dated May 8, 2020 in U.S. Appl. No. 16/434,717.
Non-Final Office Action dated Feb. 20, 2020 in U.S. Appl. No. 16/738,323.
International Search Report and Written Opinion dated Jun. 15, 2020 in International Application No. PCT/DK2020/050077.
International Search Report and Written Opinion dated Jul. 1, 2020 in International Application No. PCT/DK2020/050076.
Final Office Action dated Jul. 21, 2020 in U.S. Appl. No. 16/434,717.
Non-Final Office Action dated Sep. 2, 2020 in U.S. Appl. No. 16/738,323.
Notice of Allowance dated Sep. 17, 2020 in U.S. Appl. No. 16/738,323.
Non-Final Office Action dated Oct. 30, 2020 in U.S. Appl. No. 16/434,717.
Non-Final Office Action dated Dec. 4, 2020 in U.S. Appl. No. 16/738,323.
First Office Action dated Apr. 1, 2021 in Chinese Application No. 201910897700.8.
1st Technical Examination and Search Report dated Jul. 20, 2021 in Danish Application No. PA 2021 00345.
Notice of allowance dated Jun. 11, 2020 in U.S. Appl. No. 16/738,323.
Notice of allowance dated Jul. 27, 2020 in U.S. Appl. No. 16/738,323.
Non-Final Office Action dated May 10, 2021 in U.S. Appl. No. 16/738,323.
Notice of allowance dated May 25, 2021 in U.S. Appl. No. 16/738,323.
English translation of Korean Office Action dated Nov. 26, 2021.
Singapore Examination and Search Report dated Mar. 9, 2022 in Singapore Application No. 11202110299V.
Singapore Examination ad Search Report dated Mar. 9, 2022 in Singapore Application No. 11202110297T.

* cited by examiner

METHOD OF SECURING AND TRANSFERRING A LOAD BETWEEN A VESSEL AND AN OFFSHORE INSTALLATION AND AN APPARATUS THEREFOR

CROSS-REFERENCE TO RELATED APPLICATION(S)

The present application is a Continuation of U.S. application Ser. No. 16/738,323, filed Jan. 9, 2020, which is a Continuation of U.S. application Ser. No. 16/434,844, filed Jun. 7, 2019, which claims priority under 35 U.S.C. § 119 to Danish Patent Application No. PA 2019 00389, filed Apr. 1, 2019, the entire contents of each of which are incorporated herein by reference.

BACKGROUND

Technical Field

The present invention relates to a method of securing and transferring a load between a vessel and an offshore installation and an apparatus therefor. In particular, the present invention relates to transferring a load between a vessel and an offshore jack-up installation.

Description of Related Art

In the offshore industry operations are performed from specialised platforms or vessels, known colloquially as "rigs". Multiple types of rig exist, such as fixed platforms, jack-ups, semi-submersibles, ships, barges and the like. The particular type of rig used can depend on a number of factors, such as water depth, rig availability, operational requirements and the like.

Offshore jack-up rigs can be used for different purposes. Some offshore jack-up rigs are used to drill and extract oil and gas. However, in order to reduce the dependence on limited fossil fuel resources around the world, there has been an increasing demand for renewable energy generation. One such source of renewable energy that has become increasingly reliable is wind energy generation.

Typically, electricity is generated from the wind with wind turbine generators (WTG) installed in locations with a reliable prevailing wind. Some wind turbine generators have been installed on land in windy areas such as on hilltops. Wind turbine generators installed on land are also known as "onshore" wind turbine generators. However, larger wind turbine generators can be installed in coastal waters. Wind turbine generators installed in coastal waters, the sea or deep ocean are also known as "offshore" wind turbine generators.

Accordingly, offshore jack-up rigs can be used for other offshore installations such as offshore WTGs. Offshore wind turbine generator installation is typically carried out in separate stages. One current method of installation is to anchor a foundation to the seabed using a monopile foundation. This is a steel and/or concrete tube which is fixed to and protrudes from the seabed. A transition piece (TP) is fixed to the monopile foundation and the transition piece projects out of the water. The offshore wind turbine generator is then fixed to the transition piece.

One such jack-up rig for installing WTGs is disclosed in EP 2 886 722. This discloses a plurality of WTG components stored on the deck of the jack-up rig ready for installation at a designated offshore area. A problem with the jack-up rig is that the WTG components are loaded on the deck of the jack-up rig in port. When all the WTG components are installed, the jack-up rig must sail back to port to be replenished with more WTG components. This reduces the amount of time that the jack-up rig can be used to install offshore WTGs in the designated offshore area.

KR20170109094 shows a jack-up vessel with a detachable deck comprising the WTG components. Once the jack-up vessel is in the designated offshore area, the legs extend and lift up a platform from the vessel using a rail system. A problem with this is that legs and platform require the jack-up vessel to move the legs and platforms between installation sites. Furthermore, when the vessel sails away from the legs, the vessel requires very calm weather in order not to collide with the legs (e.g. due to heave, roll or sway of the vessel due to the waves.

Alternatively, a jack-up rig can be supplied with WTG components via a supply vessel. One such supply vessel is shown in KR20180003214. A problem with the supply vessel is that the transfer of the WTG components to the jack-up vessel can be difficult especially in bad weather. This means that the jack-up vessel cannot be resupplied until there is a suitably long calm weather window.

SUMMARY

Examples described hereinafter aim to address the aforementioned problems.

According to an aspect of the present invention there is a method of securing a vessel with an offshore jack-up having a hull and a plurality of moveable legs engageable with the seafloor and the offshore jack-up is arranged to move the legs with respect to the hull to position the hull out of the water, wherein the method comprises: moving at least a portion of a vessel underneath the hull of the offshore jack-up or within a cut-out of the hull when the hull is positioned out of the water and the legs engage the seafloor; engaging a stabilizing mechanism mounted on the jack-up against the vessel; pushing the stabilizing mechanism down on the vessel to increase the buoyant force acting on the vessel; and lifting a cargo from the vessel with a plurality of lifting arms mounted on the jack-up after the stabilizing mechanism pushes down on the vessel.

Optionally, the stabilizing mechanism can push against the deck of the vessel.

Optionally the stabilizing mechanism may be a plurality of stabilizing arms.

Optionally the vessel can be substantially fixed with respect to the hull when stabilizing mechanism pushes down on the vessel.

Optionally the vessel may be accessible from above when the vessel is within the cut-out.

Optionally the offshore jack-up may comprises a crane with a working area extending over the cut-out portion of the hull.

Optionally the hull may comprises at least one guide structure for laterally positioning the vessel underneath the hull or within the cut-out.

Optionally the at least one guide structure may be a first guide structure and a second guide structure and the plurality of stabilizing arms are mounted along the first guide structure and the second guide structure.

Optionally the hull may comprises at least one stop structure for limiting the extent the vessel moves forward underneath the hull.

Optionally the stabilizing mechanism may be extendible underneath the hull.

Optionally each of the stabilizing arms may comprise a self-seating head for engaging in a reciprocal hole in the deck of the vessel.

Optionally at least one pair of stabilizing arms may engage the vessel on opposites sides of the centre of buoyancy of the vessel.

Optionally the plurality of the stabilizing arms may engage the vessel at substantially the same time.

Optionally the cargo load may be one or more of a wind turbine tower, a nacelle, wind turbine blades, a wind turbine generator component, equipment, personnel, supplies, a transition piece, a monopile, a jacket and/or any other components of an offshore wind turbine generator or wind turbine generator farm.

Optionally the method may comprise placing cargo on the deck of the vessel whilst the stabilizing mechanism pushes down on the vessel.

Optionally the method may comprise engaging a bow of the vessel with a moveable coupling mechanism mounted on the hull.

Optionally the vessel may be pivotable about the moveable coupling mechanism before the stabilizing mechanism engages the vessel.

Optionally the vessel may comprise a plurality of hulls.

In another aspect of the invention there is provided an offshore jack-up comprising: a hull; a plurality of moveable legs engageable with the seafloor, wherein the offshore installation is arranged to move the legs with respect to the hull to position the hull out of the water when the legs engage the seafloor; a stabilizing mechanism mounted on the jack-up engageable with a vessel positioned underneath the hull of the offshore jack-up or within a cut-out in the hull when the hull is positioned out of the water; wherein when the stabilizing mechanism push down on the vessel, the buoyant force acting on the vessel increases; and a plurality of lifting arms mounted on the jack-up arranged to lift a cargo on the vessel after the stabilizing mechanism pushes down on the vessel.

In yet another aspect of the invention there is provided a method of securing a vessel with an offshore installation fixed to the seabed having an above-water structure, the method comprising: moving at least a portion of a vessel underneath the above-water structure of the offshore installation or within a cut-out of the above-water structure; engaging a stabilizing mechanism mounted on the above-water structure on the vessel; pushing the stabilizing mechanism down on the vessel to increase the buoyant force acting against the vessel; and lifting a cargo from the vessel with a plurality of lifting arms mounted on the offshore installation after the stabilizing mechanism pushes down on the vessel.

BRIEF DESCRIPTION OF THE DRAWINGS

Various other aspects and further examples are also described in the following detailed description and in the attached claims with reference to the accompanying drawings, in which:

DETAILED DESCRIPTION

Examples of the present disclosure relate to methods and apparatus for securing and transferring a load between a vessel and an offshore jack-up. In some examples, any form of offshore installation and any form of vessel may be utilised. However, for the illustrative purposes only, the following description is provided with reference to an offshore jack-up such as a jack-up rig, a jack-up barge, a lifting vessel or a jack-up vessel.

Figure 1:
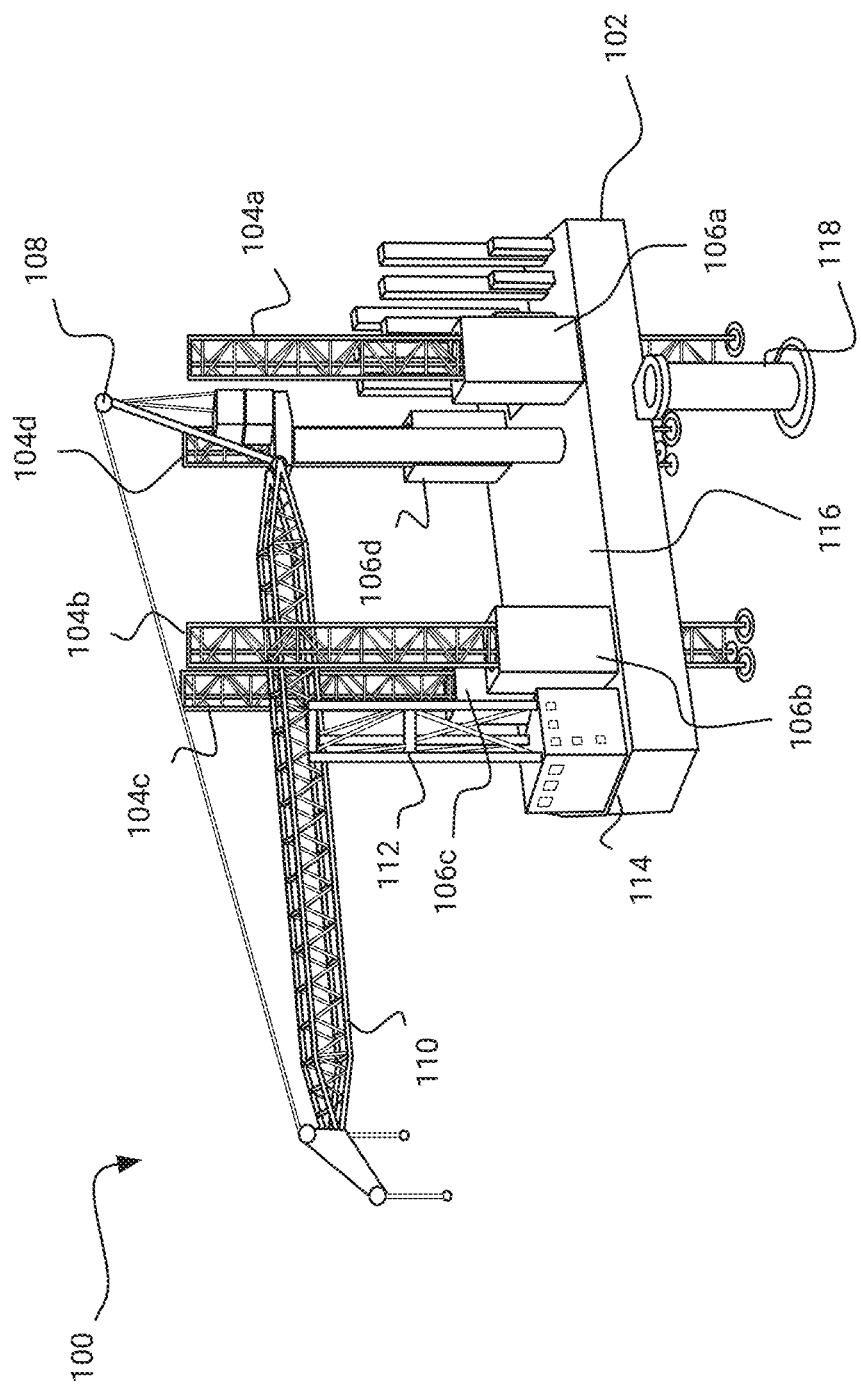
FIG. 1 shows a perspective view of an offshore jack-up according to an example.

FIG. 1 shows a perspective view of an offshore jack-up 100 according to an example. The offshore jack-up 100 is a jack-up rig 100 and the term "jack-up" 100 will be used hereinafter. However, the methods and apparatus discussed below can be used with other offshore installations and other forms of jack-up equipment such as jack-up vessels or jack-up barges.

The jack-up 100 comprises a hull 102 and a plurality of moveable legs 104a, 104b, 104c, 104d. In the example as shown in FIG. 1, there are four moveable legs 104a, 104b, 104c, 104d, but in other examples there can be three moveable legs or more than four moveable legs. In some examples as shown in FIG. 1, the moveable legs 104a, 104b, 104c, 104d, are open truss legs, but in other examples the moveable legs 104a, 104b, 104c, 104d, are solid cylindrical legs.

The moveable legs 104a, 104b, 104c, 104d extend downwardly through the hull 102 via respective jacking mechanisms 106a, 106b, 106c, 106d. The jacking mechanisms 106a, 106b, 106c, 106d comprise a casing for protecting the jacking mechanisms 106a, 106b, 106c, 106d. The jacking mechanisms 106a, 106b, 106c, 106d, in some examples, are hydraulically operated rack and pinion mechanisms. The operation of a jack-up 100 is known and will not be discussed in further detail.

In FIG. 1 the jack-up 100 is illustrated with the moveable 104a, 104b, 104c, 104d 14 in an extended position. When the moveable legs 104a, 104b, 104c, 104d are in the extended position, the moveable legs 104a, 104b, 104c, 104d extend down to and engage the seafloor 200. For the purposes of clarity, the seafloor 200 is not shown in FIG. 1 and the moveable legs 104a, 104b, 104c, 104d are partially shown. The engagement of the moveable legs 104a, 104b, 104c, 104d with the seafloor 200 is better shown in e.g. FIGS. 2 and 3.

Figure 2:
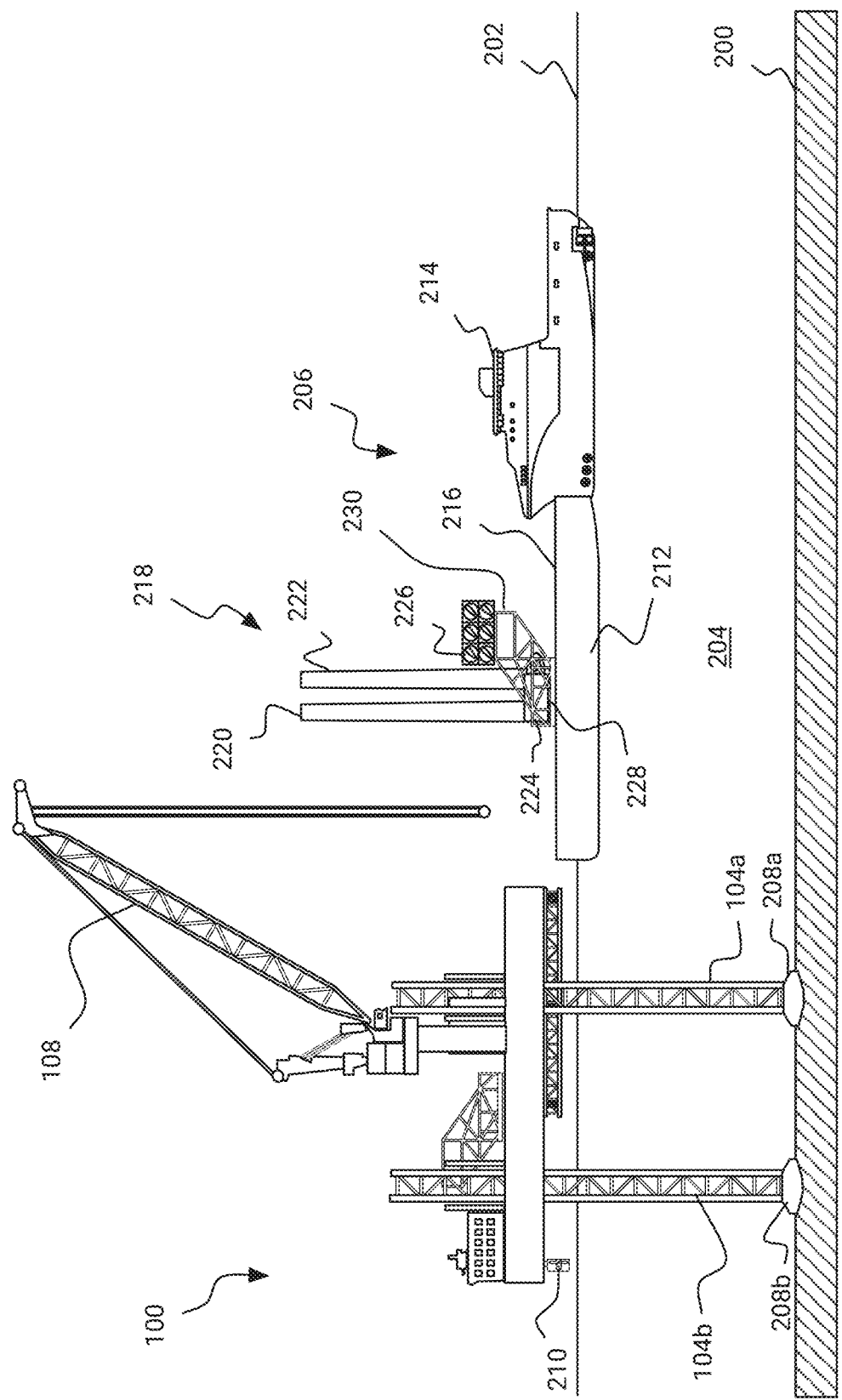
FIG. 2 shows a side view of an offshore jack-up with an unsecured vessel according to an example.
Figure 5:
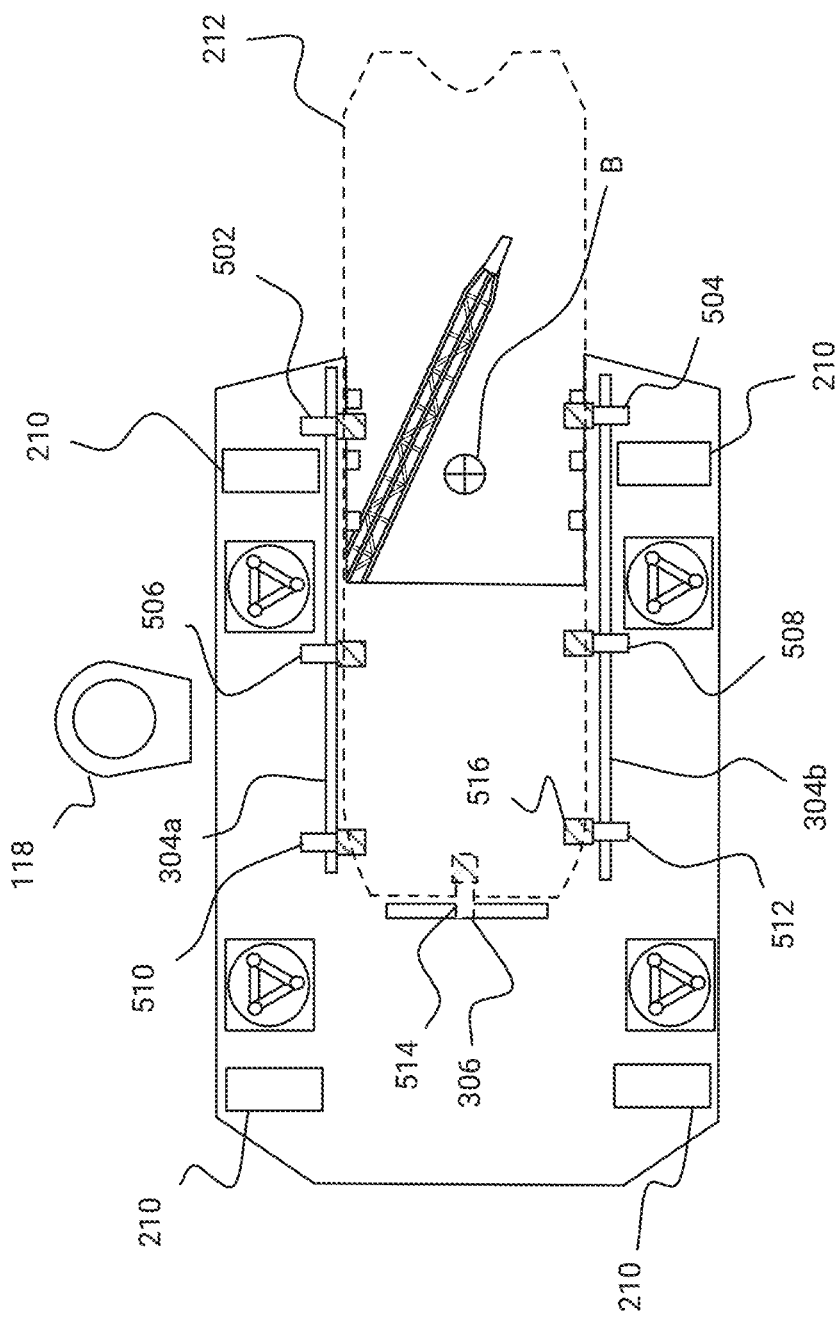
FIG. 5 shows an underneath plan view of an offshore jack-up according to an example.

The moveable legs 104a, 104b, 104c, 104d are moveable between the extended position and a retracted position, such that the hull 102 may float on the surface 202 of a body of water 204, and may be transported to a desired location. In some examples, the jack-up 100 comprises one or more propulsors 210 such as an azimuthing thruster (as shown in FIG. 2) for moving the jack-up 100 between WTG installation sites. In an example, the jack-up 100 comprises four azimuthing thrusters 210 in each corner of the hull 102 as shown in FIG. 5. Alternatively, in some examples, the jack-up 100 does not comprise propulsors 210 and is towed when the jack-up 100 is moved. In some examples, the jack-up 100 is towed with a vessel between the port and the WTG installation site whether or not the jack-up 100 comprises propulsors 210.

FIG. 1 shows the jack-up 100 in an operational configuration where the hull 102 has been raised above the surface 202 of the water 204. During operation of the jack-up 100, a crane 108 can lift loads for offshore operations. In some examples, the crane 108 is configured to lift one or more components of a wind turbine generator (WTG). The jack-up 100 as shown in FIG. 1 is arranged to install WTGs. In other examples, the jack-up 100 is arranged to install or maintain other offshore structures.

The jack-up 100 as shown in FIG. 1 is positioned adjacent to a (transition piece) TP 118 of a WTG. The TP 118 is ready to receive one or more WTG components 220 such as the WTG tower 222, the WTG nacelle 224, and the WTG blades 226.

The crane 108 comprises a boom 110 which is resting on a boom rest 112. The boom 110 of the crane 108 is positioned on the boom rest 112 when the jack-up 100 is sailing between locations. The boom rest 112 is mounted on an accommodation block 114. In examples, there are additional accommodation blocks (not show) arranged on a deck 116 of the hull 102. The boom 110 is moveable to an operational position as shown in e.g. FIGS. 2 and 3 in order to hoist loads. The crane 108 and the operation thereof is known and will not be described in further detail.

The hull 102 comprises a deck 116 for storing equipment for the offshore installation operation. In some examples, one or more WTG components 220 are stored on the deck 116. For the purposes of clarity, no WTG components 220 have been shown in FIG. 1.

A problem with existing jack-up rigs which are used to install multiple WTGs in a designated area is that the jack-up rigs must sail back to port to be resupplied. This means that the jack-up rig spends time sailing to port which could be used installing more WTGs. Examples described in this disclosure provide methods and apparatuses for resupplying the jack-up 100 without requiring the jack-up 100 to sail back to port.

Turning to FIG. 2, the jack-up 100 will be described in further detail. FIG. 2 shows a side view of the jack-up 100 with an unsecured vessel 206 according to an example.

The jack-up 100 as shown in FIG. 2 is in an operational configuration. The moveable legs 104a, 104b are extended and feet 208a, 208b mounted on the moveable legs 104a, 104b are partially embedded in the soft seafloor 200. This means that the jack-up 100 is stable and able to lift heavy loads with the crane 108.

The vessel 206 comprises a barge 212 tethered to an anchor handling vessel 214. The anchor handling vessel 214 is arranged to transport the barge 212 into the vicinity of the jack-up 100. In some examples, the vessel 206 is a barge 212 which comprises propulsors (not shown) for moving the barge 212 under its own power and no anchor handling vessel 214 is required. In some examples the anchor handling vessel 214 is instead another powered vessel such as platform supply vessel (PSV), multipurpose support vessel (MSV) tug boats, ice breaker, patrol boat, coast guard vessel, navy vessel, fire-fighting vessel, or any other suitable vessel for managing the movement the barge 212. The term "vessel" 206 is a powered barge 212, an unpowered barge 212, or a combination of a barge 212 and another powered vessel 214 such as an anchor handling vessel 214.

The barge 212 comprises a deck 216 for securing and transporting loads to the jack-up 100. As shown in FIG. 2, a cargo load 218 is positioned on the deck 216. The cargo load 218 is one or more WTG components 220 for installing on the TP 118. Specifically, the WTG components 220 comprise one or more towers 222, one or more nacelles 224 and one or more blades 226. In other examples, the cargo load 218 can be additionally or alternatively one or more of equipment, personnel, and/or supplies for the jack-up 100. In other examples, the cargo load 218 can be additionally or alternatively one or more of a transition piece, a monopile, a jacket and/or any other components of an offshore wind turbine generator or wind turbine generator farm.

Optionally, the WTG components 220 are securely mounted to a cargo carrying platform 228 comprises a frame 230 for surrounding the cargo load 218. The cargo carrying platform 228 and the frame 230 will be discussed in further detail below. FIG. 2 also shows another cargo carrying platform 232 with a similar frame 230 which is empty and positioned on the deck 116 of the jack-up 100. In some examples, the deck 116 of the jack-up 100 has clear space for receiving one or more full or empty load carrying platforms 228, 232 on the deck 116 of the jack-up 100. In some examples, the load carrying platforms 228, 232 are received on the deck 116 between two of the moveable legs 104b, 104c.

In an example (not shown), the WTG components 220 are mounted directly on the barge deck 216. However, as shown in FIG. 2, the cargo carrying platform 228 is secured to the deck 216 of the barge 212 with at least one securing mechanism (not shown). In some examples, the at least one securing mechanism can be a twistlock mechanism or a quick release clamp for selectively securing and releasing the cargo carrying platform 228 to the deck 216 of the barge 212. The at least one securing mechanism in some examples can be mounted on the cargo carrying platform 228.

As shown in FIG. 2, the anchor handling vessel 214 is guiding the barge 212 towards the jack-up 100. In FIG. 2, the barge 212 is not coupled to the jack-up 100. This means that the barge 212 and the anchor handling vessel 214 will move relative to the jack-up 100 due to the motion of the sea (e.g. heave, sway, surge, roll, pitch and/or yaw of the barge 212 and/or the anchor handling vessel 214).

This means that if the weather conditions are too rough, the barge 212 and the anchor handling vessel 214 cannot approach the jack-up 100. Once there is a suitably calm weather window, the barge 212 and the anchor handling vessel 214 move towards the jack-up 100.

Figure 3:
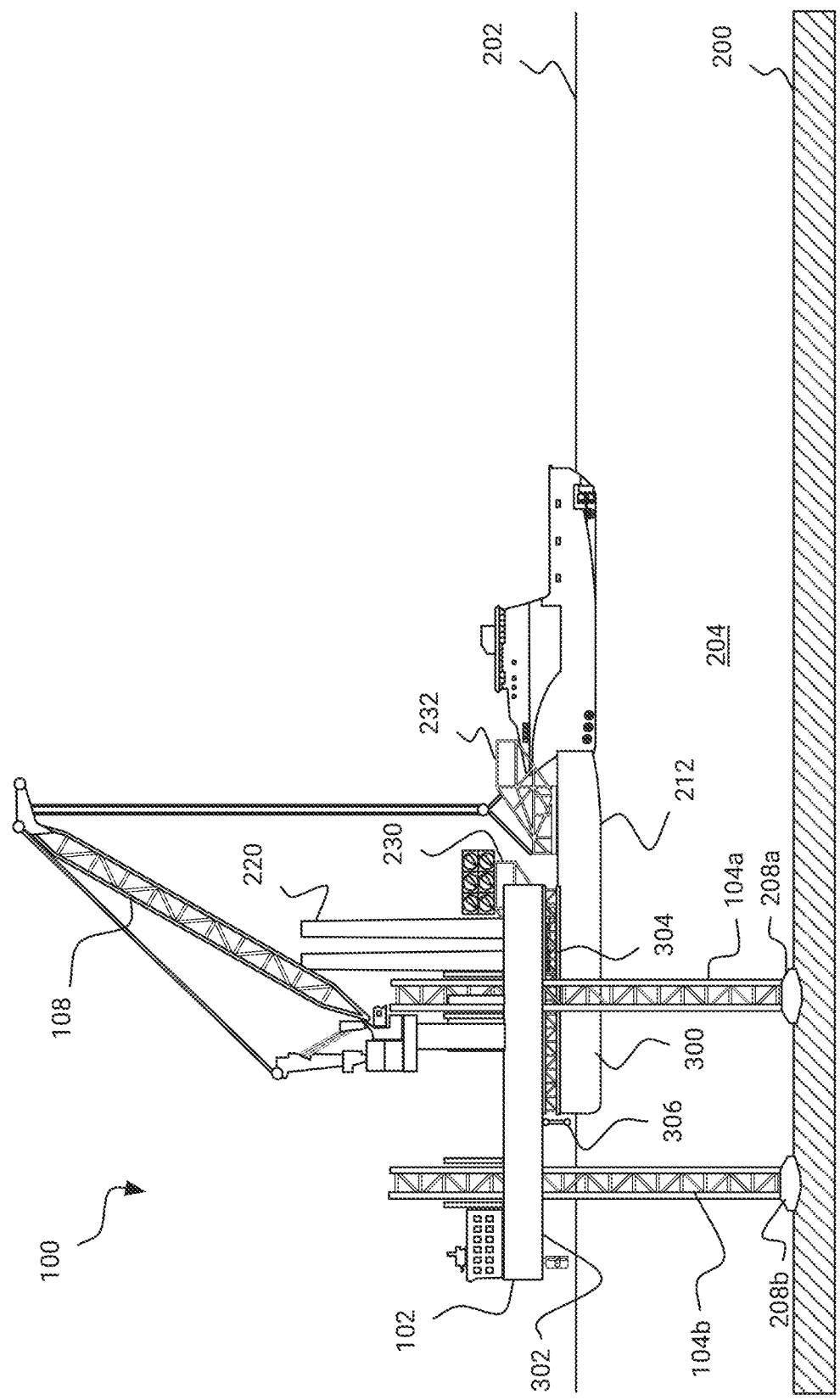
FIG. 3 shows a side view of an offshore jack-up with a secured vessel according to an example.

Turning to FIG. 3, the method of securing the barge 212 will be described in further detail. FIG. 3 shows a side view of an offshore jack-up 100 with a secured vessel 206 e.g. the barge 212 according to an example.

At least a portion 300 of the barge 212 is moved underneath the hull 102 of the offshore jack-up 100 when the hull 102 is positioned out of the water 204 and the moveable legs 104a, 104b engage the seafloor 200. The jack-up 100 is in the operational configuration and the hull 102 is above the surface 202 of the water 204. In this way, there is clearance between the bottom 302 of the hull 102 and the surface 202 of the water 204 for receiving the portion 300 of the barge 212.

The hull 102 of the jack-up 100 may comprise at least one guide structure 304 for laterally positioning the portion 300 of the barge 212 underneath the hull 102 or within a cut-out 400 of the hull 102. The cut-out 400 is described in further detail below. In some examples, there is a first lateral guide structure 304a and a second lateral guide structure 304b for limiting the lateral movement of the barge 212 with respect to the hull 102 or with respect to the cut-out 400. The first and second lateral guide structures 304a, 304b are best shown in FIG. 5. In other examples, there is a single guide structure 304 mounted on the underside of the hull 102 for guiding the barge 212.

This means that if the barge 212 is moving sideways with respect to the hull 102, for example due to currents, the first and second lateral guide structures 304a, 304b will prevent the barge 212 from colliding with the moveable legs 104a, 104b, 104c, 104d when the barge 212 is underneath the hull 102. In addition, the first and second lateral guide structures 304a, 304b limit the movement of the barge 212 with respect to the hull 102 and therefore this prevents the frame 230 and the WTG components 220 from colliding with the jack-up 100. The first and second lateral guide structures 304a, 304b extend downwardly from the hull 102 and project towards the surface 202 of the water 204.

In an example, optionally the hull 102 of the jack-up 100 comprises at least one stop structure 306 for limiting the extent the barge 212 moves forward underneath the hull 102. In another example, there are several stop structures 306 for limiting the extent the barge 212 moves forward underneath the hull 102. In another example, there is not a stop structure 306 and the anchor handling vessel 214 maintains the position of the barge 212 with respect to the jack-up 100 before the barge 212 is secured to the jack-up 100. Similarly, in another example, there are no first and second lateral guide structures 304a, 304b and the anchor handling vessel 214 maintains the position of the barge 212 with respect to the jack-up 100.

The at least one stop structure 306 extends downwardly from the hull 102 and projects towards the surface 202 of the water 204. In some examples, the at least one stop structure 306 and the first and second lateral guide structures 304a, 304b comprise an open lattice structure. This allows the water 204 to flow through the at least one stop structure 306 and the first and second lateral guide structures 304a, 304b and reduce the drag on the jack-up 100 when the jack-up 100 is being moved.

As shown in FIG. 3, the crane 108 has hoisted the empty cargo carrying platform 232 and lowered the empty cargo carrying platform 232 on to the deck 216 of the barge 212. This means that the barge 212 can be used to supply loads 218 and retrieve empty load carrying platform 232. Accordingly, the jack-up 100 can be replenished more efficiently if the load carrying platforms 228, 232 are reused.

Figure 4:
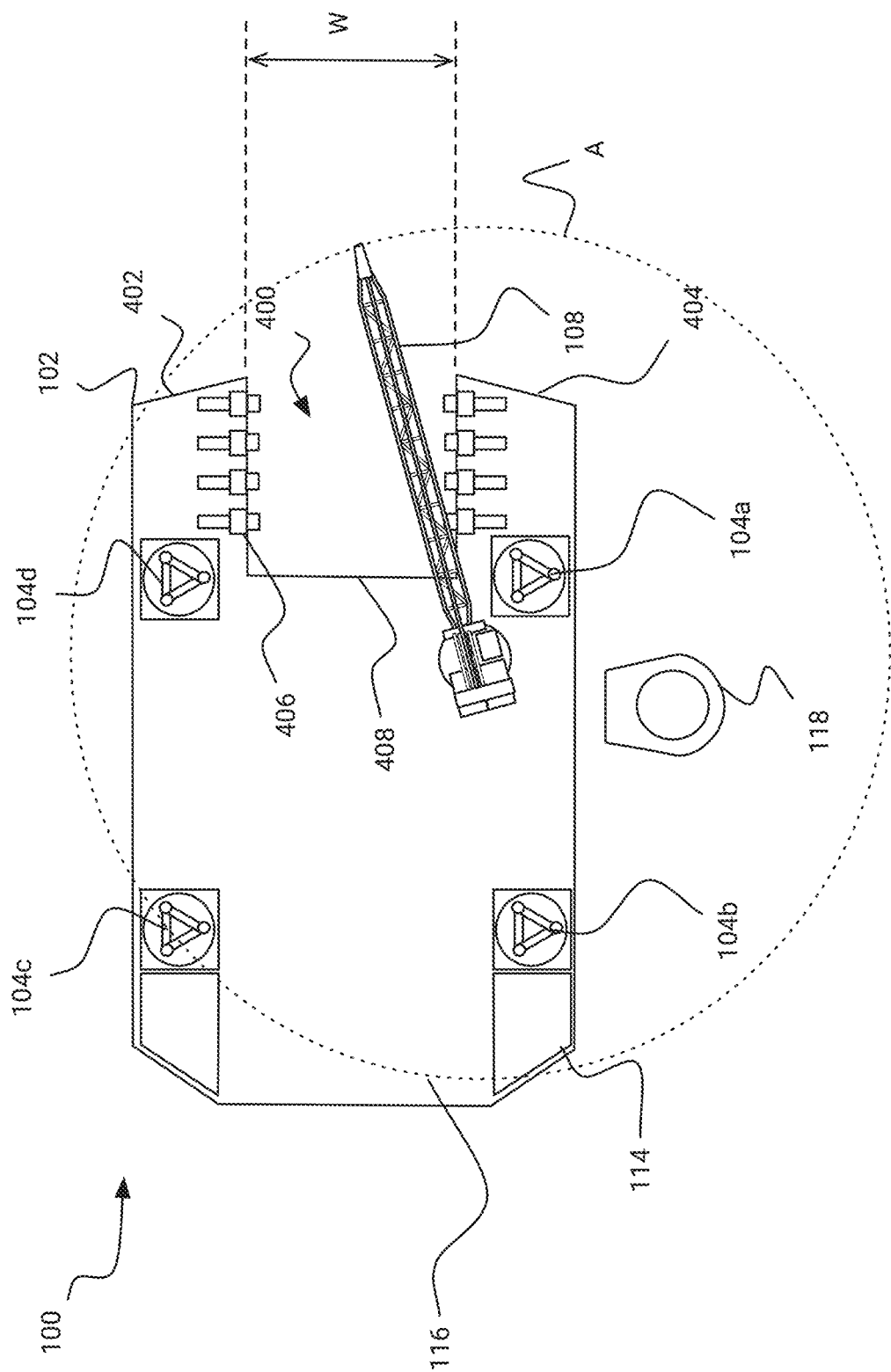
FIG. 4 shows a plan view of an offshore jack-up according to an example.

The jack-up 100 will now be described in further detail with respect to FIGS. 4 and 5. FIG. 4 shows a plan view of an offshore jack-up 100 according to an example. FIG. 5 shows an underneath plan view of an offshore jack-up 100 according to an example. For the purposes of clarity, FIGS. 4 and 5 are shown without the frame 230 or the WTG components 220.

The hull 102 comprises a cut-out 400 at one end of the jack-up 100. In this way, a portion of the hull 102 comprises first arm 402 and a second arm 404 which project out and define the cut-out 400. The cut-out 400 is arranged to receive a portion of the barge 212 or the cargo carrying platform 228.

This means the hull 102 comprises a cut-out portion 400 whereby the deck 216 of the barge 212 is accessible from above when at least a portion 300 of the barge 212 is underneath the hull 102 of the offshore jack-up 100. This means that the cargo load 218, for example the cargo carrying platform 228 comprising the WTG components 220 can be lifting vertically off the deck 216 of the barge 212. In some examples, the cargo carrying platform 228 is lifted through the cut-out 400 in the hull 102.

In the example shown in FIGS. 4 and 5, the cut-out 400 is in the periphery of the hull 102 of the jack-up 100. In another example (not shown) which is less preferred, the cut-out 400 is located in the centre of the deck 116 of the jack-up 100. This means that the deck 116 of the jack-up 100 comprises a hole for receiving the cargo carrying platform 228.

In an example, the crane 108 comprises a working area A extending over the cut-out 400 of the hull 102. Accordingly, the crane 108 can hoist objects from the deck 216 of the barge 212 and lower them on to the deck 116 of the jack-up 100. The working area A covers most of the deck 116 of the jack-up 100 and the location of the TP 118. In other examples, the working area A of the crane 108 covers the entire deck 116 of the jack-up 100. This means that the crane 108 can hoist WTG components 220 from the deck 116 of the jack-up 100 and/or the deck 216 of the barge 212. The crane 108 can then lower the WTG components 220 onto the deck 116 of the jack-up 100 or the TP 118.

FIG. 4 shows the hull 102 comprising a lifting mechanism 406 mounted on hull 102. In an example the lifting mechanism 406 is mounted around the periphery 408 of the cut-out 400. The lifting mechanism 406 is configured to lift the cargo carrying platform 228 between a first position on the deck 216 of the barge 212 and a second position wherein the cargo carrying platform 228 is clear of the deck 216 of the barge 212. When the lifting mechanism 406 lifts the cargo carrying platform 228 into the second position, the cargo carrying platform 228 is no longer in physical contact with the barge 212. In this respect, the cargo carrying platform 228 is fixed with respect to the lifting mechanism 406 when in the second position. This means that the movement of the barge 212 due to the water 204 does not move the load carrying platform 406.

Figure 9:
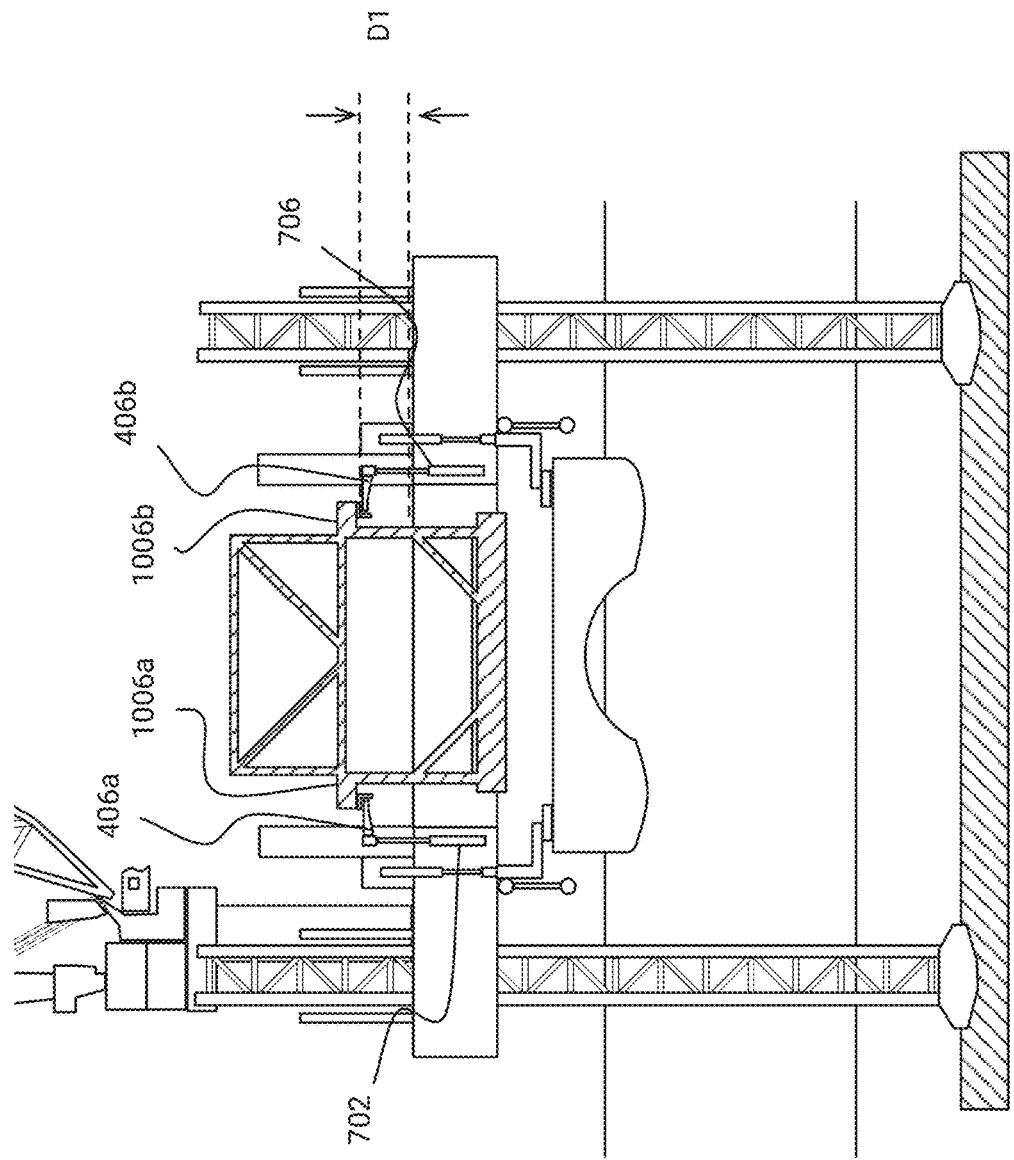
FIG. 9 shows another front side view of an offshore jack-up with a secured vessel according to an example.

In an example, the lifting mechanism 406 lifts the cargo carrying platform 228 in a vertical distance D1 (as shown in FIG. 9). In some examples, the distance D1 is 3 m. In some examples, the vertical distance D1 is 1 m to 5 m. In some examples, the lifting mechanism 406 lifts the cargo carrying platform 228 to a height above the deck 216 of the barge 212 where the deck 216 of the barge 212 cannot impact the underside of the cargo carrying platform 228. The vertical distance D1 can be varied depending on the weather conditions and the size of the waves. In some examples, the vertical distance D1 is greater than the vertical displacement of the barge 212 experiences due to the waves e.g. heave. For example, if the barge 212 experiences a heave of plus or minus 2 m, then the lifting mechanism 406 lifts the cargo carrying platform 228 a vertical distance D1 of greater than 2 m.

Accordingly, as soon as the lifting mechanism 406 lifts the cargo carrying platform 228 off the barge 212, the barge 212 can be moved out from underneath the hull 102. This means that there can be a quick transfer of the cargo load 218 and the WTG components 220 to the jack-up 100 from the barge 212. This means that the barge 212 and the anchor handling vessel 214 can wait near the jack-up 100 and transfer the cargo load 218 to the jack-up 100 in a small calm weather window.

FIG. 4 shows the lifting mechanism 406 is a plurality of lifting arms 406. For the purposes of clarity only one lifting arm 406 has been labelled in FIG. 4. In an example, the lifting arms 406 are spaced along the first arm 402 and the second arm 404. This means that the plurality of lifting arms 406 each lift the cargo carrying platform 228. FIG. 4 shows that there are eight lifting arms 406, however, in other examples there can be any other number of suitable lifting arms 406. In one example, there can be two lifting arms 406 which are positioned either side of the centre of gravity of the cargo carrying platform 228. In other examples, there can be any other number of lifting arms 406 e.g. three, four, six, ten etc.

Turning to FIG. 5, the underside of the jack-up 100 will now be described. FIG. 5 shows a dotted outline of the barge 212 position with respect to the jack-up 100.

In an example, a stabilizing mechanism 502, 504, 506, 508, 510, 512 is mounted on the jack-up 100. In an example, the stabilizing mechanism 502, 504, 506, 508, 510, 512 comprises a plurality of stabilizing mechanisms 502, 504, 506, 508, 510, 512. In an example, the stabilizing mechanism 502, 504, 506, 508, 510, 512 is a plurality of stabilizing arms 502, 504, 506, 508, 510, 512. In an example, a plurality of stabilizing arms 502, 504, 506, 508, 510, 512 are mounted on the hull 102. The stabilizing arms 502, 504, 506, 508, 510, 512 are engageable with the barge 212. In an example, the stabilizing arms 502, 504, 506, 508, 510, 512 are engageable with the structure of the barge 212 such as the deck 216 or any other suitable portion of the barge 212. The stabilizing arms 502, 504, 506, 508, 510, 512 are engageable with the deck 216 of the barge 212 positioned underneath the hull 102 or within the cut-out 400. The stabilizing arms 502, 504, 506, 508, 510, 512 push down on the deck 216 of the barge 212 and this reduces the relative movement of the barge 212 with respect to the jack-up 100. When the stabilizing arms 502, 504, 506, 508, 510, 512 push down on the deck 216 of the barge 212, the buoyant force acting on the barge 212 increases. This results in the barge 212 being engaged with the jack-up 100 stops or limits the relative movement therebetween. In other words, the waves and current of the water 204 acting on the barge 212 do not cause the barge 212 to move relative to the jack-up 100 when the stabilizing arms 502, 504, 506, 508, 510, 512 engage the deck 216 of the barge 212.

In an example, when the stabilizing arms 502, 504, 506, 508, 510, 512 engage with the deck 216, the stabilizing arms 502, 504, 506, 508, 510, 512 dampen the movement of the barge 212. The stabilizing arms 502, 504, 506, 508, 510, 512 comprise a dampener such as a hydraulic piston 700, 704 (described in further detail below). In some examples, the dampener 700, 704 is coupled to the stabilizing mechanism and can be one or more of a spring, a resilient material, or an electro-mechanical dampener, cables and a winch or any other suitable means for dampening the movement of the barge 212.

In an example, the stabilizing mechanism 502 is a single pad (not shown) that engages the deck 216 of the barge 212. The single pad is a substantially flat planar surface that engages a substantial area of the deck 216. Since the single pad is of a large area, the pad can push down on the deck 216 of the barge 212 along most of the barge 212. In this way, the stabilizing mechanism 502 comprises a single engaging element for stabilizing the barge 212.

In some examples, the stabilizing arms 502, 504, 506, 508, 510, 512 are mounted on the underside of the hull 102. Each of the stabilizing arms 502, 504, 506, 508, 510, 512 are extendible underneath the hull 102 towards the surface 202 of the water 204.

In an example, the stabilizing arms 502, 504, 506, 508, 510, 512 are spaced along the hull 102. The stabilizing arms 502, 504, 506, 508, 510, 512 are arranged to engage both sides of the barge 212 along the longitudinal length of the barge 212. As shown in FIG. 5 there are six stabilizing arms 502, 504, 506, 508, 510, 512. However, in other examples, there can be three or more stabilizing arms 502, 504, 506, 508, 510, 512. In the less preferred example with only three stabilizing arms, there are a first and second stabilising arm 502, 504 at the sides of the barge 212. A third stabilizing arm 514 (shown in dotted lines) is positioned at the bow of the barge 212 aligned with the centreline of the barge 212. In other examples, there can be any number of stabilizing arms 502, 504, 506, 508, 510, 512.

In an example, the jack-up 100 comprises a moveable coupling mechanism (not shown) mounted on cut-out 400. The moveable coupling mechanism is configured to releasably engage with the bow of the barge 212 when the barge 212 abuts the stop structure 306. In some examples, the coupling mechanism is mounted to the stop structure 306. In some examples, a first part of the coupling mechanism is mounted on the stop structure 306 and a second part of the coupling mechanism is mounted on the bow of the barge 212. In some examples, the first part of the coupling mechanism and the second part of the coupling mechanism are a latch and catch mechanism. In some examples, the barge 212 is pivotable about the moveable coupling mechanism before the plurality of stabilizing arms 502, 504, 506, 508, 510, 512 engage the deck 216 of the barge 212.

In an example, at least one pair of stabilizing arms 502, 504, 506, 508, 510, 512 engages the deck 216 on opposites sides of the centre of buoyancy B of the barge 212. In an example, there are at least two pairs of stabilizing arms 502, 504, 506, 508, 510, 512 engages the deck 216 on opposites sides of the centre of buoyancy B of the barge 212. In an example, one stabilizing arm 514 can be part of two pairs 514, 502 and 514, 504 of stabilizing arms on opposites sides of the centre of buoyancy B of the barge 212. This means that when the stabilizing arms 502, 504, 506, 508, 510, 512 push down on the deck 216 of the barge 212, the turning moments about the centre of buoyancy B are balanced. Accordingly, the barge 212 is not subjected to a rolling or a pitching motion due to the force of the stabilizing arms 502, 504, 506, 508, 510, 512 acting on the deck 216 of the barge 212.

In an example, the plurality of stabilizing arms 502, 504, 506, 508, 510, 512 are mounted adjacent to the first lateral guide structure 304a and the second lateral guide structure 304b. This means that when the barge 212 is aligned between the first lateral guide structure 304a and the second lateral guide structure 304b, the stabilizing arms 502, 504, 506, 508, 510, 512 are aligned correctly for engaging with the deck 216 of the barge 212. In some examples, the stabilizing arms 502, 504, 506, 508, 510, 512 are mounted to the first lateral guide structure 304a and the second lateral guide structure 304b. The stabilizing arms 502, 504, 506, 508, 510, 512 each comprise an engagement head 516 projecting inwardly towards the barge 212. For the purposes of clarity only one engagement head 516 has been labelled in FIG. 5.

Figure 6:
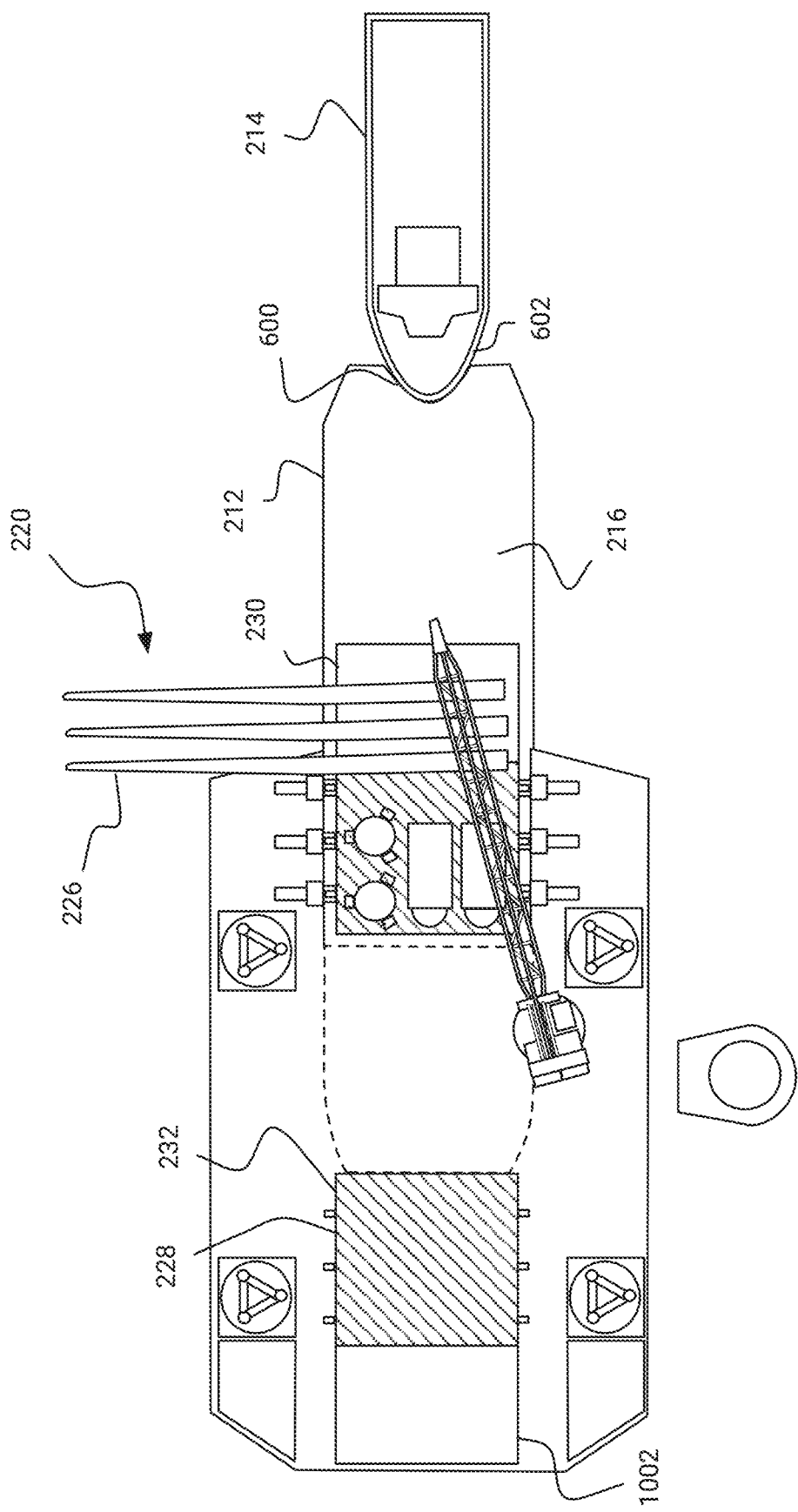
FIG. 6 shows a plan view of an offshore jack-up with a secured vessel according to an example.

As can be seen from FIG. 6, when the barge 212 is in position, the frame 230 can be lifted off from the deck 216 of the barge 212. FIG. 6 shows a plan view of an offshore jack-up 100 with the barge 212 secured to the jack-up 100 according to an example.

FIG. 6 shows the anchor handling vessel 214 pushing the barge 212 into position with respect to the jack-up 100. The barge 212 comprises a stern cut-out 600 for receiving and engaging with the bow 602 of the anchor handling vessel 214. The stern cut-out 600 engaging with the bow 602 provides for a stable connection between the anchor handling vessel 214 and the barge 212 when the anchor handling vessel 214 pushes the barge 212.

The barge 212 has been pushed into position and abuts the stop structure 306 (not shown in FIG. 6) and is aligned between the first lateral guide structure 304a and the second lateral guide structure 304b (again not shown in FIG. 6). The frame 230 is ready to be lifted off the deck 216 of the barge 212 once the barge 212 has been secured with respect to the jack-up 100.

The WTG components 220 are shown mounted on the frame 230. In particular, the blades 226 may extend out sideways beyond the footprint of the hull 102. Of course, the WTG components 220 can be orientated in any direction as required. If the WTG components 220 are oversized e.g. wider than the cut-out 400 width W (as shown in FIG. 4), then the oversized WTG components 220 such as the blades 226 are positioned at a suitable height and orientation. For example, the oversized components e.g. blades 226 are positioned such that the blades 226 do not collide with the first arm 402 and/or the second arm 404 of the hull 102 when the cargo carrying platform 228 is lifted from the first position to the second position.

Figure 7:
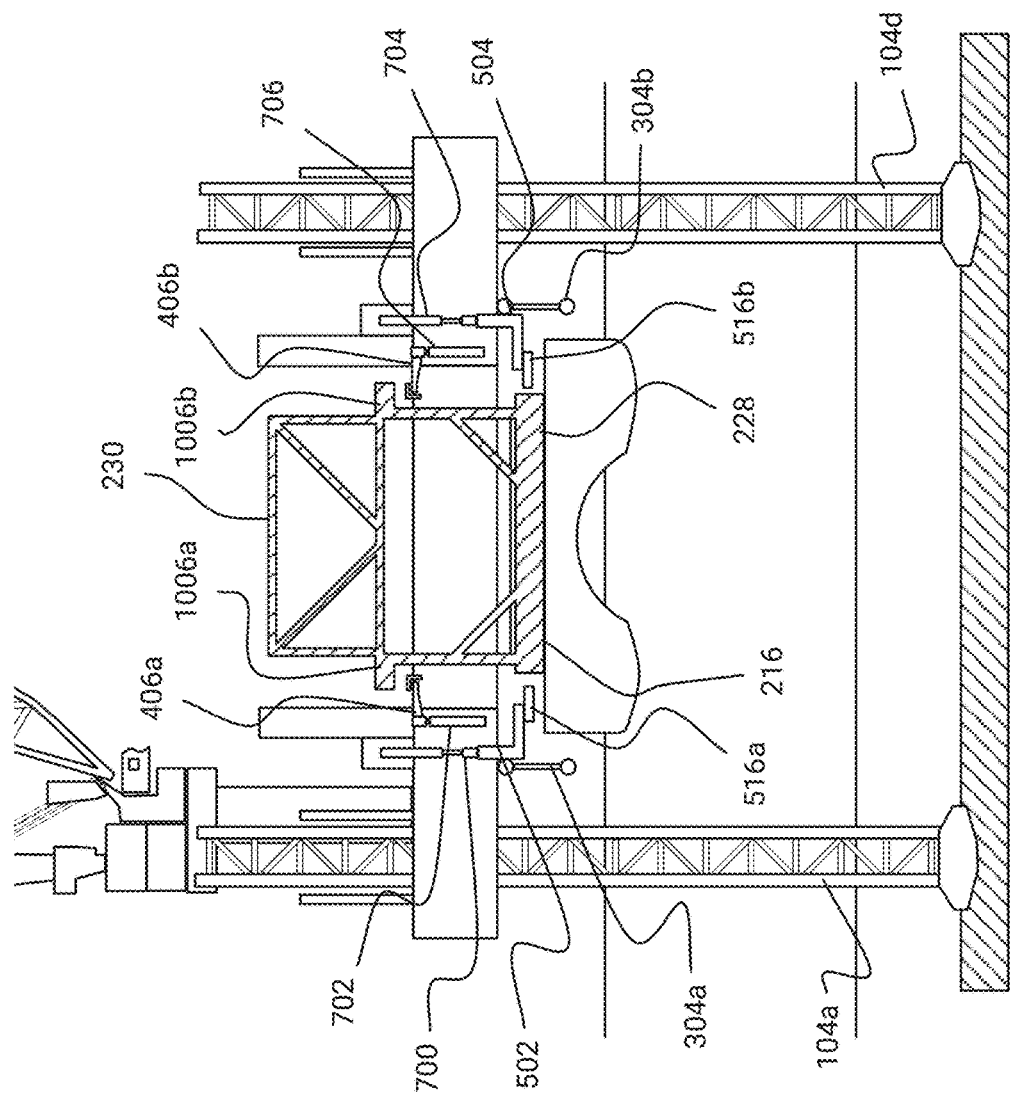
FIG. 7 shows a front side view of an offshore jack-up with an unsecured vessel adjacent to the offshore jack-up according to an example.
Figure 8:
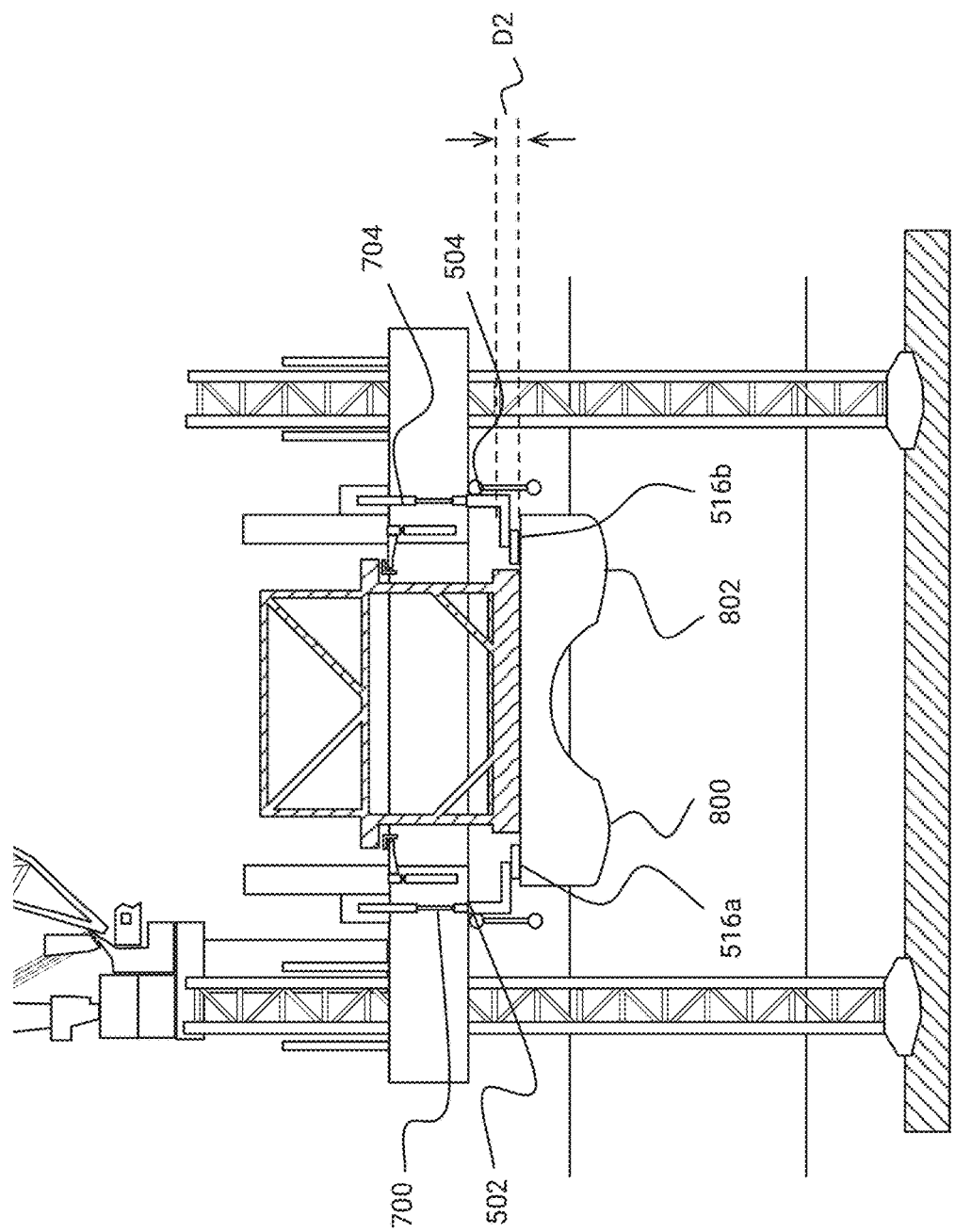
FIG. 8 shows a front side view of an offshore jack-up with a secured vessel according to an example.

The steps of the securing and transferring method will now be described in further detail with respect to FIGS. 7 to 9, 10, 12 and 13. FIGS. 7 to 9 show a front side view of an offshore jack-up 100 with the barge 212 at different steps of securing the barge 212 and transferring the load 218. For the purposes of clarity, only the barge 212 (and not the anchor handling vessel 214) is shown in FIGS. 7 to 9.

Figure 10:
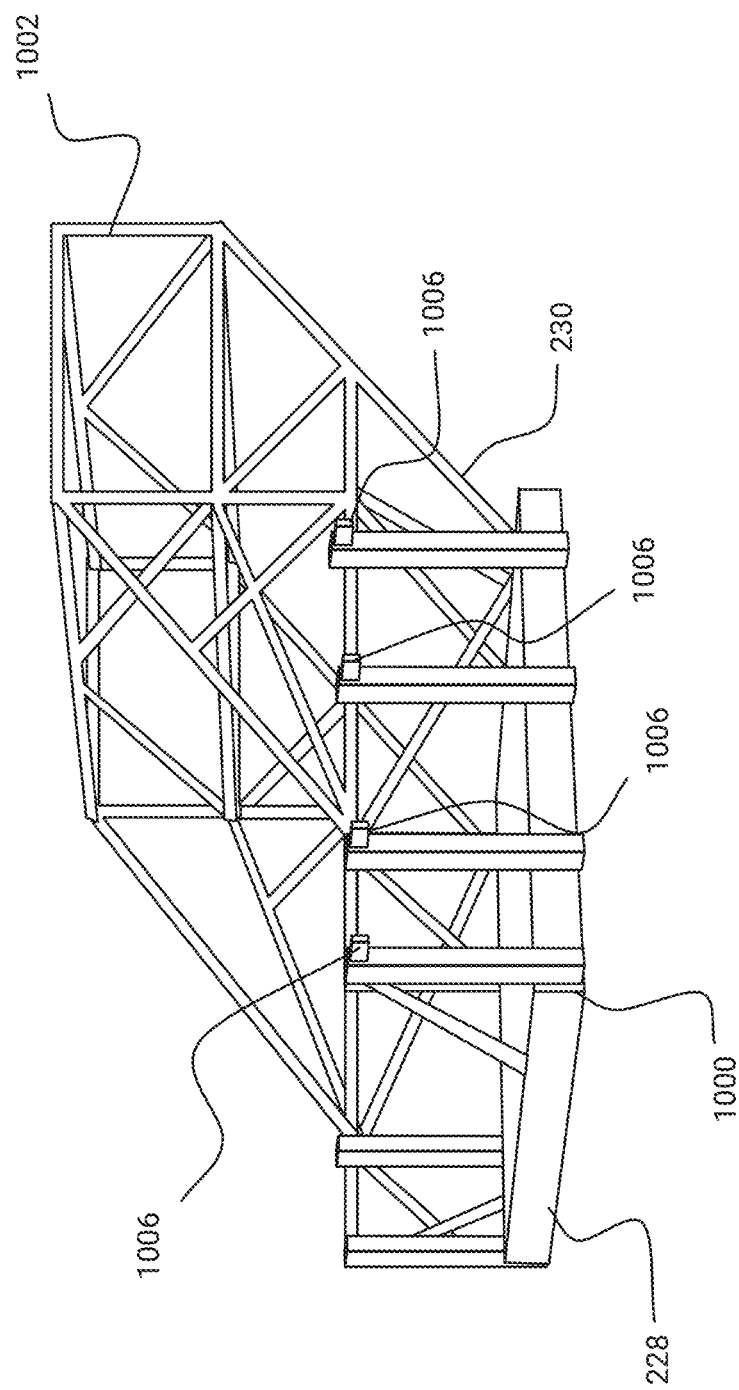
FIG. 10 shows a perspective view of a load carrying platform according to an example.

Turning briefly to FIG. 10, the cargo carrying platform 228 will be briefly described. FIG. 10 shows a perspective view of a cargo carrying platform 228 according to an example. FIG. 10 shows the cargo carrying platform 228 comprising a frame 230 which surrounds the periphery 1000 of the cargo carrying platform 228. The frame 230 surrounds the cargo load 218 and protects the supply load from being damaged during lifting and moving operations. This means that the frame 230 can be handled by the lifting mechanism 406 and the crane 108. In this way, the frame 230 protects the cargo load 218 e.g. WTG components 220 from minor damage such as scratches, dents etc. This means that the WTG components 220 are less likely to need painting or repair after installation.

The cargo carrying platform 228 is substantially planar and comprises a plurality of securing mechanisms 604 or lashing points. FIG. 6 shows clamps 604 for clamping to the bottom of the WTG towers 222 to maintain the WTG towers 222 in an upright position. The securing mechanisms 604 can be clamps or other suitable securing mechanisms 604. Further securing mechanisms 604 such as clamps can be used with the WTG nacelle 224 and the WTG blades 226. In some examples, the cargo carrying platform 228 receives WTG components 220 for two WTGs. In other examples, each cargo carrying platform 228 is configured to receive the WTG components 220 for a single WTG. In other examples, each cargo carrying platform 228 is configured to receive the WTG components 220 for any number of WTGs e.g. three, four etc WTGs.

The frame 230 comprises an elevated fastening position 1002 for securing the blades 226. The elevated fastening position 1002 is adjacent to the footprint of the cargo carrying platform 228. This can be seen in FIG. 6 when viewing the empty load carrying platform 232. In an example, the frame 230 comprises a plurality of bracing struts for strengthening the frame 230.

The cargo carrying platform 228 comprises a plurality of vertical posts 1004. Each of the vertical posts 1004 comprises a lateral projection 1006 each engageable with one of the lifting arms 406. In some examples, the lateral projections 1006 are optional. Indeed, the lifting arms 406 can lift the cargo carrying platform 228 from underneath the cargo carrying platform 228. Alternatively in other examples, the cargo carrying platform 228 comprises holes for receiving reciprocal pegs mounted on the lifting arms 406.

In some examples, the frame 230 is optional. Indeed, the cargo carrying platform 228 is only a flat horizontal platform. In other examples, the cargo carrying platform 228 is a securely removeable top deck 216 of the barge 212.

Turning back to FIGS. 7 to 9, the method will now be described. The cargo load 218 e.g. the WTG components 220 are not shown in FIGS. 7 to 9 for the purposes of clarity. The supply carrying platform 228 is mounted on the deck 216 of the barge 212.

Figure 12:
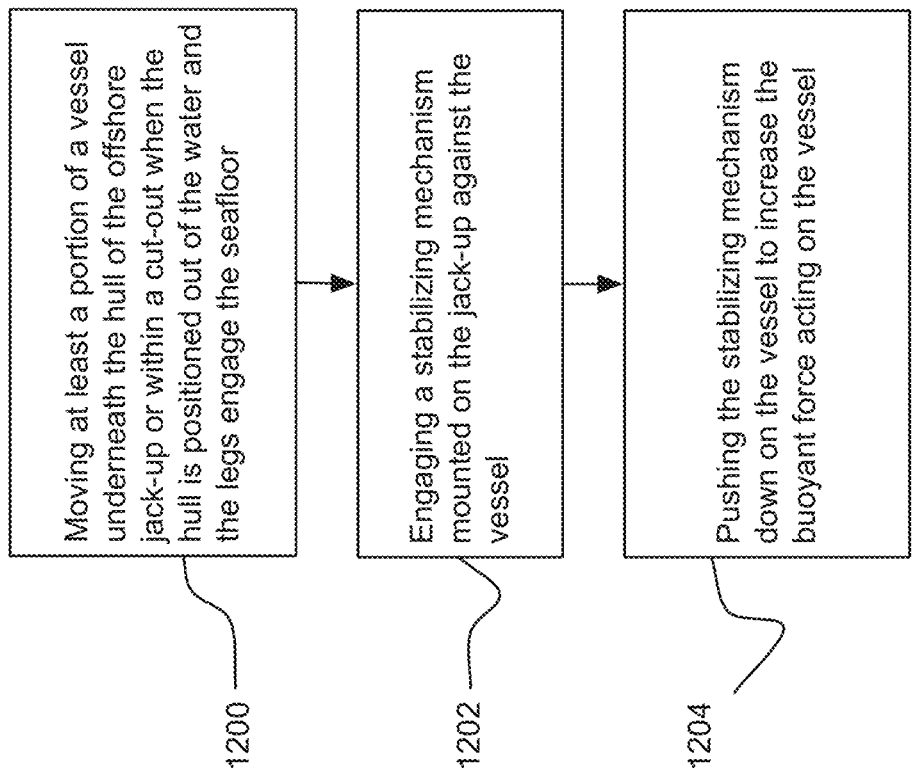
FIGS. 12 and 13 show a flow diagram of methods according to an example.
Figure 13:
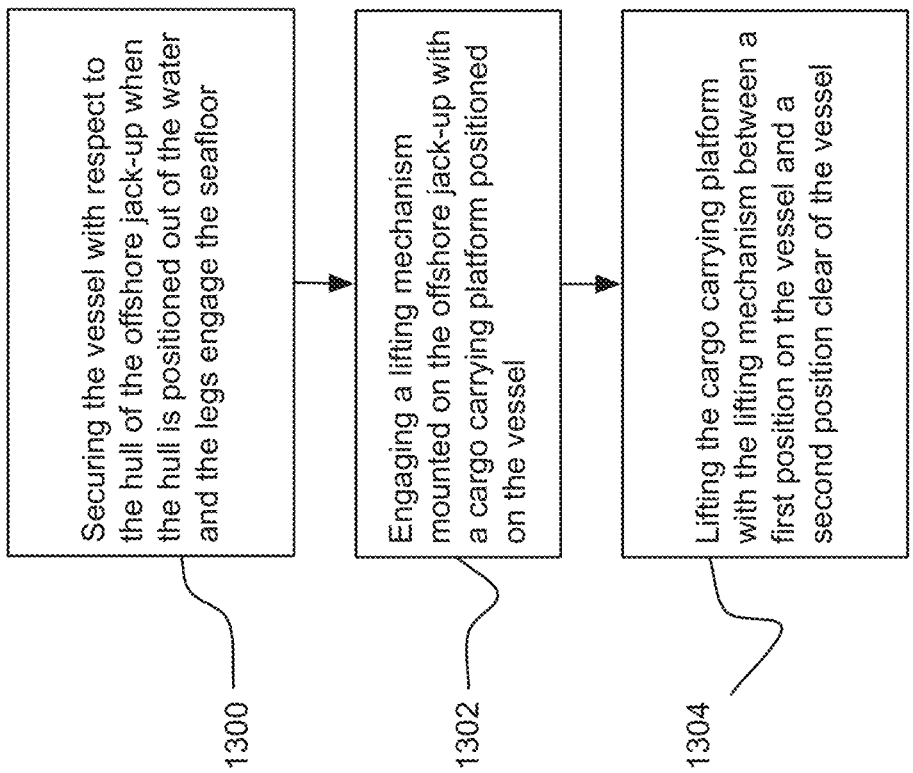

In FIG. 7, the barge 212 has been moved such that at least a portion 300 of the barge 212 is underneath the hull 102 of the offshore or within a cut-out 400 of the hull 102 jack-up 100 as shown in step 1200 of FIG. 12. FIGS. 12 and 13 show a flow diagram of methods according to an example. The barge 212 as shown in FIG. 7 is not in engagement with the stabilizing arms 502, 504. Furthermore, the lifting arms 406a on the port side of the barge 212 and the lifting arms 406b on the starboard side of the barge 212 are not in engagement with the lateral projections 1006a, 1006b on the cargo carrying platform 228.

This means that the barge 212 can move relative to the jack-up 100. The position of the cargo carrying platform 228 is the same as shown in FIG. 6. That is, the cargo carrying platform 228 is within the cut-out 400 of the hull 102.

In an example, the stabilizing arms 502, 504 and the lifting arms 406a, 406b are actuated with hydraulics. Each of the stabilizing arms 502, 504 and the lifting arms 406a, 406b are respectively coupled to a hydraulic actuator 700, 704, 702, 706. The hydraulic actuators 700, 702, 704, 706 are coupled to a hydraulic system (not shown) for controlling and actuating the hydraulic actuators 700, 702, 704, 706. In an example, each of the stabilizing arms 502, 504 and the lifting arms 406a, 406b are coupled to another mechanism for actuating and extending the stabilizing arms 502, 504 and the lifting arms 406a, 406b. For example, the mechanism can be a rack and pinion mechanism, mechanical linkage, or any other suitable mechanism for extending and retracting the stabilizing arms 502, 504 and the lifting arms 406a, 406b.

Whilst reference in FIGS. 7 to 9 is made to the stabilizing arms 502, 504 and the lifting arms 406a, 406b, the same mechanisms and methods of operation are applicable to the other stabilizing arms 502, 504, 506, 508, 510, 512, 514 and the lifting arms 406 discussed in reference to the previous FIGS. 1 to 6.

Once the barge 212 is in position, the stabilizing arms 502, 504 are extended to secure the barge 212 as shown in step 1300 in FIG. 13. The plurality of stabilizing arms 502, 504 mounted on the hull 102 are extended and engage against the deck 216 of the barge 212 as shown in step 1202 of FIG. 12. In an example, the stabilizing arms 502, 504 can dampen the movement of the barge 212 due to the water 204 and this allows for a soft engagement with the deck 216 of the barge 212.

As can be seen from FIG. 8, the hydraulic actuators 700, 704 have been actuated and extend the stabilizing arms 502, 504 until the engagement heads 516a, 516b are in physical engagement with the deck 216 of the barge 212. Once the engagement heads 516a, 516b are seated correctly on the deck 216, then the hydraulic actuators 700, 704 continue to be actuated and extend the stabilizing arms 502, 504 further. Accordingly, the stabilizing arms 502, 504 are pushed against the deck 216 of the barge 212 to increase the buoyant force acting on the barge 212 as shown in step 1204 in FIG. 12. In some examples, the steps 1202 and 1204 can be one continuous movement. Alternatively, there can be a pause between steps 1202 and 1204 in order to check that the engagement heads 516a, 516b are seated correctly on the deck 216.

In some examples, the plurality of the stabilizing arms 502, 504 engage the deck 216 at substantially the same time. This means that the barge 212 does not experience a turning moment about the centre of buoyancy as the stabilizing arms push down on the barge 212. In other examples, the stabilizing arms 502, 504 engage the deck 216 at slightly different times in order to accommodate different parts of the barge 212 moving at different rates.

This means that the stabilizing arms 502, 504 push the barge 212 into the water 204 by a vertical distance D2. This prevents the barge 212 from moving with respect to the jack-up 100. This means that the barge 212 is secured to the jack-up 100. In some examples, the vertical distance D2 is between 0.1 to 2 m. In some other examples, the vertical distance D2 is between 0.3 to 1.5 m. In some other examples, the vertical distance D2 is between 0.5 to 1 m.

In some examples the barge 212 is a monohulled vessel. In some examples, the barge 212 is a multihull vessel as shown in FIGS. 7 to 9. FIGS. 7 to 9 show the barge 212 have two hulls 800, 802, but in other examples the barge 212 can comprise any number of hulls. This means that the volume of water that is displaced when the stabilizing arms 502, 504 are pushed down in step 1204 is reduced. Accordingly, the force required to push the barge 212 down with the stabilizing arms 502, 504 is reduced compared to pushing down on a monohulled barge 212

After the barge 212 is secured with respect to the jack-up 100, the FIG. 9 shows that the hydraulic actuators 702, 706 have been actuated and extend the lifting arms 406a, 406b so that they engage the lateral projections 1006a, 1006b of the cargo carrying platform 228. In this way, the lifting mechanism 406 mounted on the jack-up 100 is engaged with a cargo carrying platform 228 positioned on the barge 212 as shown in step 1302 in FIG. 13. Once the lifting arms 406a, 406b have engaged the lateral projections 1006a, 1006b, the lifting arms 406a, 406b lift the cargo carrying platform 228 between a first position on the barge 212 and a second position clear of the barge 212 as shown in step 1304 of FIG. 13.

In some examples, the steps 1302 and 1304 can be one continuous movement. Alternatively, there can be a pause between steps 1302 and 1304 in order to check that the lifting arms 406a, 406b are engaged correctly with the cargo carrying platform 228.

In some examples, the plurality of the lifting arms 406a, 406b engage the lateral projections 1006a, 1006b at substantially the same time. This means that the cargo carrying platform 228 is lifted in a stable manner. In some examples, the lifting arms 406a, 406b move at different rates in order ensure that the cargo remains balanced on the cargo carrying platform 228.

As shown in FIG. 9 and previously discussed above, the lifting arms 406a, 406b lift the cargo carrying platform 228 by a vertical distance D1. Once the cargo carrying platform 228 has disengaged from the barge 212, the cargo carrying platform 228 is fixed with respect to the lifting arms 406a, 406b. In other words, the motion of the water 204 will not affect the cargo carrying platform 228 once it is in the second position.

In some examples, once the cargo carrying platform 228 is in the second position, the crane 108 hoists the cargo carrying platform 228. The crane 108 may hoist the cargo carrying platform 228 to another part of the deck 116 of the jack-up 100 as shown in FIG. 6. The crane 108 may hoist another cargo carrying platform 232 from the jack-up 100 to the barge 212 at this point as shown in FIG. 3.

In some examples, when the barge 212 is secured to the jack-up 100 as described in step 1204, the crane 108 can place a load on the deck 216 of the barge 212. The load can be an empty cargo carrying platform 232 as described above.

Figure 11:
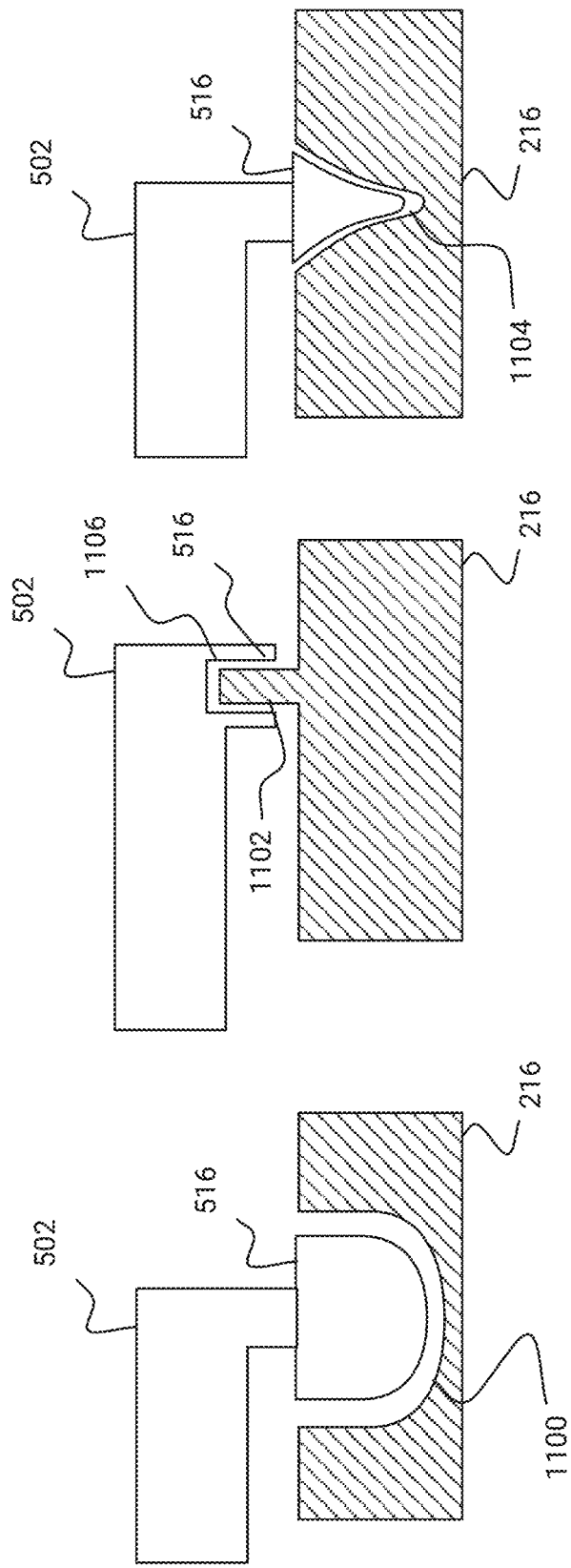
FIGS. 11a, 11b and 11c show a schematic side cross sectional view of part of a vessel and an offshore jack-up according to an example.

In some examples, the engagement heads 516 on the stabilizing arms 502, 504, 506, 508, 510, 512, 514 comprise optional self-seating engagement heads. FIGS. 11a, 11b, 11c shown different example couplings between the stabilizing arms 502, 504, 506, 508, 510, 512, 514 and the deck 216 with different shapes of engagement heads 516. FIG. 11a shows a semi-spherical engagement head 516 or elongated curved head configured to seat in a reciprocally curved hole 1100 in the deck 216 of the barge 212.

FIG. 11b shows an upstanding peg 1102 mounted on the deck 216 configured to seat in a reciprocal hole 1106 in the engagement head 516.

FIG. 11c shows a conical engagement head 516 configured to seat in a reciprocally conically curved hole 1104 in the deck 216 of the barge 212. In other examples, the lifting arms 406 and the lateral projections 1106 comprise similar couplings to those shown in FIGS. 11a to 11c. In other examples, the surfaces on the engagement heads 516 and the deck 216 are flat.

Figure 14:
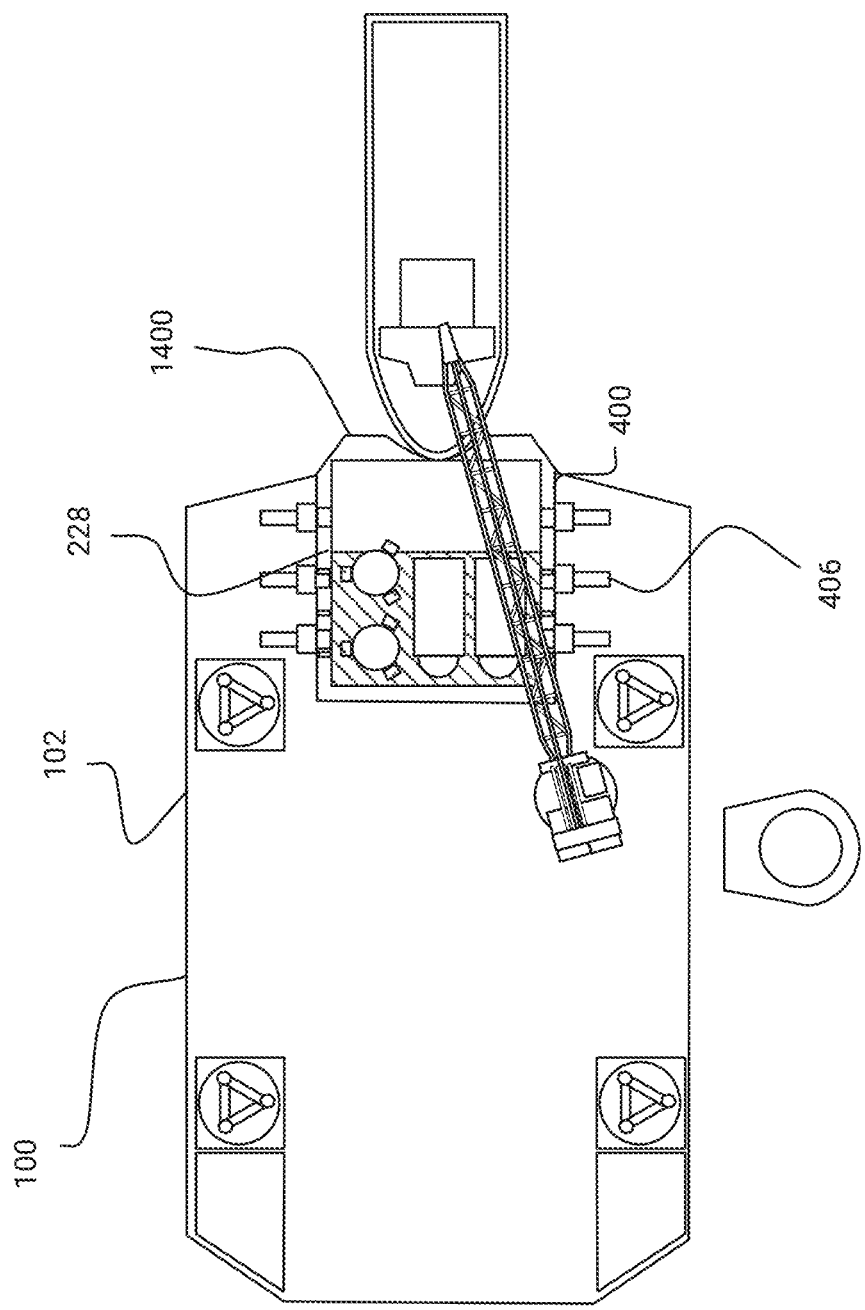
FIG. 14 shows an underneath plan view of an offshore jack-up according to an example.
Figure 15:
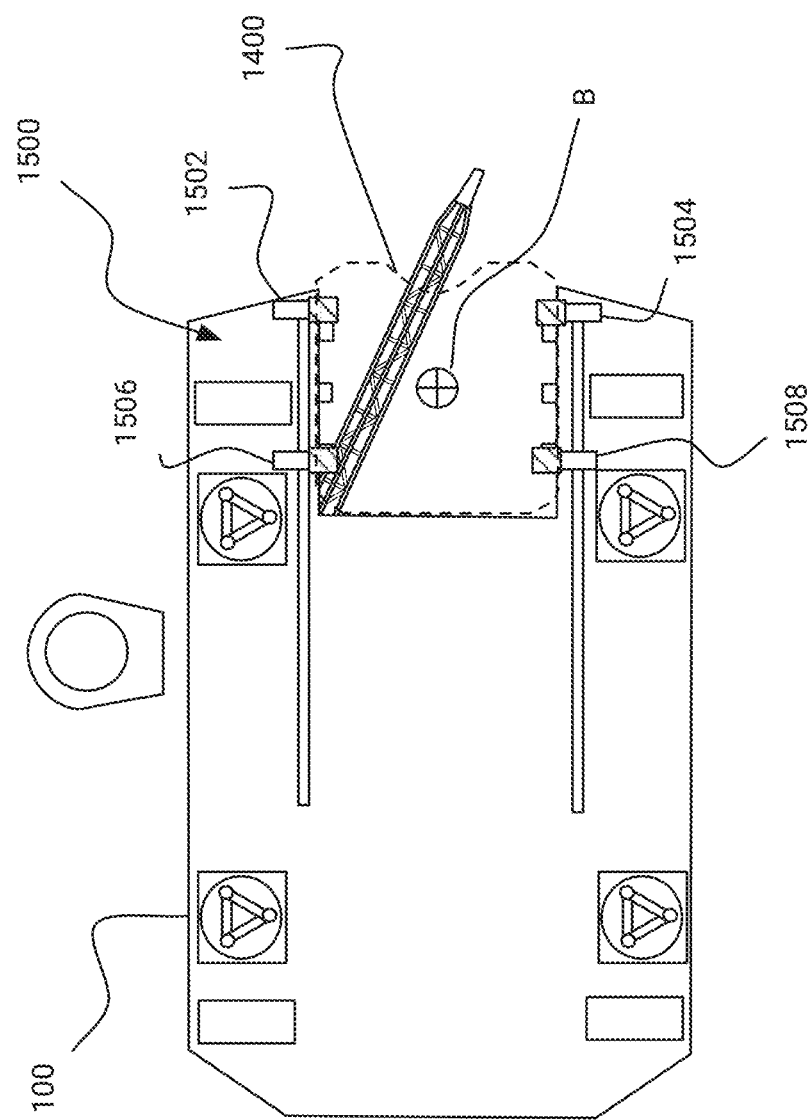
FIG. 15 shows a plan view of an offshore jack-up with a secured vessel according to an example.

Another example will now be described with respect to FIGS. 14 and 15. FIG. 14 shows an underneath plan view of an offshore jack-up 100 according to an example. FIG. 15 shows a plan view of an offshore jack-up 100 with a secured vessel according to an example. FIGS. 14 and 15 show examples which are similar to the examples described in reference to FIGS. 1 to 13. FIG. 14 shows a barge 1400 which is smaller than the barge 212 described in the previous examples. In particular, the barge 1400 is aligned within the cut-out 400 of the hull 102. In this way, the barge 1400 does not have a portion of the barge 1400 which is underneath the hull 102. Instead, at portion of the barge 1400 is wholly contained within the cut-out 400. Some or all of the length of the barge 1400 can be aligned within the cut-out 400. In some examples, the barge 1400 can project out from the cut-out 400 away from the jack-up 100.

The cargo carrying platform 228 as shown in FIG. 14 is lifted from the barge 212 by the lifting mechanism 406 in the same way as discussed above with respect to the previous examples.

Similarly, the stabilizing mechanism 1500 operates in the same way at the stabilizing mechanism 502, 504, 506, 508, 510, 512 as discussed in reference to the previous examples shown in FIGS. 1 to 13. However, the placement of the stabilizing arms 1502, 1504, 1506, 1508 has been adapted to the barge 1400. Since the barge 1400 is smaller, the centre of buoyancy B has moved and the stabilizing arms 1502, 1504, 1506, 1508 are moved accordingly. In this way, there maintained four pairs 1) 1502, 1506 and 2) 1502, 1504 and 3) 1506, 1508 and 4) 1508, 1504 of stabilizing arms on opposites sides of the centre of buoyancy B of the barge 1400.

In another example, the shape, size, orientation, extension, and placement of the stabilizing mechanisms 502, 504, 506, 508, 510, 512, 1502, 1504, 1506, 1508 and the lifting mechanism 406 are configurable and adaptable to different vessels 212. For example, different barges 212 can have different shape, sizes and draft depending on the cargo and other factors.

In another embodiment two or more embodiments are combined. Features of one embodiment can be combined with features of other embodiments.

Embodiments of the present invention have been discussed with particular reference to the examples illustrated. However it will be appreciated that variations and modifications may be made to the examples described within the scope of the invention.

The invention claimed is:

1. A method of supplying a load between a vessel and an offshore jack-up, the offshore jack-up having a hull, a plurality of moveable legs engageable with the seafloor, and a stabilizing mechanism mounted thereon, the hull having a first guide structure and a second guide structure, and the plurality of moveable legs configured to move with respect to the hull to position the hull out of water, the method comprising:
   positioning a portion of the vessel between the first guide structure and the second guide structure to laterally position the vessel underneath the hull or within a cut-out in the hull when the hull is positioned out of the water and the plurality of moveable legs engage the seafloor;
   pushing the stabilizing mechanism down on the vessel to increase a buoyant force acting on the vessel, and to limit movement of the vessel with respect to the hull of the offshore jack-up; and
   lifting a cargo carrying frame between a first position on the vessel and a second position clear of the vessel with a lifting mechanism mounted on the offshore jack-up.

2. The method according to claim 1, wherein the cargo carrying frame surrounds at least a portion of the load.

3. The method according to claim 1, wherein the cargo carrying frame is mountable to a deck of the vessel.

4. The method according to claim 3, wherein the cargo carrying frame includes a plurality of sea fastenings configured to releasably secure the cargo carrying frame to the deck of the vessel.

5. The method according to claim 1, wherein the lifting comprises:
   hoisting the cargo carrying frame with a crane.

6. The method according to claim 1, further comprising:
   positioning the cargo carrying frame within the cut-out in the hull before the pushing.

7. The method according to claim 6, wherein the lifting comprises:
   lifting the cargo carrying frame through the cut-out in the hull.

8. The method according to claim 1, further comprising:
   hoisting, by a crane mounted on the offshore jack-up, another cargo carrying frame from the offshore jack-up to the vessel.

9. The method according to claim 1, further comprising:
   securing the load to the cargo carrying frame with at least one attachment mechanism.

10. The method according to claim 1, wherein the stabilizing mechanism includes a plurality of hydraulically actuated arms.

11. The method according to claim 1, further comprising:
    extending the stabilizing mechanism underneath the hull.

12. The method according to claim 1, further comprising:
    limiting forward movement of the vessel underneath the hull using at least one third guide structure of the hull.

13. The method according to claim 1, wherein the cargo carrying frame is configured to carry one or more of a wind turbine tower, a nacelle, a wind turbine blade, or a wind turbine component.

14. An offshore jack-up comprising:
    a hull;
    a plurality of moveable legs configured to engage with the seafloor, and to move with respect to the hull to position the hull out of water when the plurality of moveable legs engage the seafloor;
    a first guide structure and a second guide structure mounted to the hull, the first guide structure and the second guide structure configured to laterally position a vessel underneath the hull or within a cut-out in the hull when the hull is positioned out of the water;
    a stabilizing mechanism mounted on the offshore jack-up, the stabilizing mechanism configured to push down on the vessel to increase a buoyant force acting on the vessel, and to limit movement of the vessel with respect to the hull of the offshore jack-up; and
    a lifting mechanism configured to lift a cargo carrying frame between a first position on the vessel and a second position clear of the vessel.

15. The offshore jack-up according to claim 14, wherein the lifting mechanism is a crane mounted on the offshore jack-up.

16. The offshore jack-up according to claim 14, further comprising:
    at least one attachment mechanism configured to secure a load to the cargo carrying frame.

17. The offshore jack-up according to claim 14, wherein the stabilizing mechanism includes a plurality of hydraulically actuated arms.

18. The offshore jack-up according to claim 14, wherein the stabilizing mechanism is configured to extend underneath the hull.

19. The offshore jack-up according to claim 14, wherein the hull includes at least one third guide structure configured to limit forward movement of the vessel underneath the hull.

20. A method of supplying a load between a vessel and an offshore jack-up, the offshore jack-up having a hull, a plurality of moveable legs engageable with the seafloor, and a stabilizing mechanism mounted thereon, the hull having a first guide structure and a second guide structure, and the plurality of moveable legs configured to move with respect to the hull to position the hull out of water, the method comprising:

positioning a portion of the vessel between the first guide structure and the second guide structure to laterally position the vessel underneath the hull or within a cut-out in the hull when the hull is positioned out of the water and the plurality of moveable legs engage the seafloor;

pushing the stabilizing mechanism down on the vessel to increase a buoyant force acting on the vessel, and to limit movement of the vessel with respect to the hull of the offshore jack-up; and lifting the load between a first position on the vessel and a second position clear of the vessel with a lifting mechanism mounted on the offshore jack-up.

21. An offshore jack-up comprising:

a hull;

a plurality of moveable legs configured to engage with the seafloor, the plurality of moveable legs configured to move with respect to the hull to position the hull out of water when the plurality of moveable legs engage the seafloor;

a first guide structure and a second guide structure mounted to the hull, the first guide structure and the second guide structure configured to laterally position a vessel underneath the hull or within a cut-out in the hull when the hull is positioned out of the water;

a stabilizing mechanism mounted on the offshore jack-up, the stabilizing mechanism configured to push down on the vessel to increase a buoyant force acting on the vessel, and to limit movement of the vessel with respect to the hull of the offshore jack-up; and a lifting mechanism configured to lift a load between a first position on the vessel and a second position clear of the vessel.

22. The offshore jack-up of claim 21, wherein the lifting mechanism is a crane mounted on the offshore jack-up.

23. The offshore jack-up according to claim 21, wherein the stabilizing mechanism includes a plurality of hydraulically actuated arms.

24. The offshore jack-up according to claim 21, wherein the stabilizing mechanism is configured to extend underneath the hull.

25. The offshore jack-up according to claim 21, wherein the hull includes at least one third guide structure configured to limit forward movement of the vessel underneath the hull.

* * * * *